(12) United States Patent
Briggs

(10) Patent No.: US 11,797,453 B2
(45) Date of Patent: *Oct. 24, 2023

(54) IN-MEMORY DISTRIBUTED CACHE

(71) Applicant: Google LLC, Mountain View, CA (US)

(72) Inventor: Asa Briggs, Zurich (CH)

(73) Assignee: Google LLC, Mountain View, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 17/449,256

(22) Filed: Sep. 28, 2021

(65) Prior Publication Data

US 2022/0019540 A1 Jan. 20, 2022

Related U.S. Application Data

(63) Continuation of application No. 16/865,861, filed on May 4, 2020, now Pat. No. 11,144,463, which is a
(Continued)

(51) Int. Cl.
*G06F 12/0871* (2016.01)
*G06F 12/0873* (2016.01)
(Continued)

(52) U.S. Cl.
CPC ........ *G06F 12/0871* (2013.01); *G06F 12/023* (2013.01); *G06F 12/0873* (2013.01);
(Continued)

(58) Field of Classification Search
CPC ............. G06F 12/0871; G06F 12/0873; G06F 12/023; G06F 12/126; G06F 12/1491;
(Continued)

(56) References Cited

U.S. PATENT DOCUMENTS 5,537,572 A 7/1996 Michelsen et al.
8,095,577 B1 1/2012 Faibish et al.
(Continued)

FOREIGN PATENT DOCUMENTS

CN 105045723 A * 11/2015
CN 105045723 A 11/2015

OTHER PUBLICATIONS

"Dynamic random-access memory", Mar. 1, 2016, Wikipedia, as preserved by the Internet Archive on Mar. 1, 2016, pp. 1-21 web.archive.org/web/20160301211255/https://en.wikipedia.org/wiki/Dynamic_random-access_memory (Year: 2016).*
(Continued)

*Primary Examiner* — Curtis James Kortman
(74) *Attorney, Agent, or Firm* — Honigman LLP; Brett A. Krueger

(57) ABSTRACT

A method for an in-memory distributed cache includes receiving a write request from a client device to write a block of client data in random access memory (RAM) of a memory host and determining whether to allow the write request by determining whether the client device has permission to write the block of client data at the memory host, determining whether the block of client data is currently saved at the memory host, and determining whether a free block of RAM is available. When the client device has permission to write the block of client data at the memory host, the block of client data is not currently saved at the memory host, and a free block of RAM is available, the write request is allowed and the client is allowed to write the block of client data to the free block of RAM.

18 Claims, 18 Drawing Sheets

Related U.S. Application Data continuation of application No. 15/803,416, filed on Nov. 3, 2017, now Pat. No. 10,664,405.

(51) Int. Cl.
*G06F 12/02* (2006.01)
*G06F 12/126* (2016.01)
*G06F 12/14* (2006.01)

(52) U.S. Cl.
CPC ........ *G06F 12/126* (2013.01); *G06F 12/1491* (2013.01); *G06F 2212/311* (2013.01)

(58) Field of Classification Search
CPC ............. G06F 12/0653; G06F 12/0868; G06F 12/121–128; G06F 2212/311; G06F 2212/604–6046; G06F 9/5016–5022
See application file for complete search history.

(56) References Cited

U.S. PATENT DOCUMENTS

| | | | | |
|---|---|---|---|---|
| 8,402,250 | B1* | 3/2013 | Juillard | ............... G06F 16/1824 711/216 |
| 8,832,234 | B1 | 9/2014 | Brooker et al. | |
| 9,164,702 | B1 | 10/2015 | Nesbit et al. | |
| 9,367,451 | B2 | 6/2016 | Nakai et al. | |
| 9,559,889 | B1* | 1/2017 | Vincent | ................. H04L 67/568 |
| 2007/0005960 | A1 | 1/2007 | McNamee et al. | |
| 2007/0180187 | A1 | 8/2007 | Olson et al. | |
| 2008/0229023 | A1 | 9/2008 | Plamondon | |
| 2011/0099320 | A1 | 4/2011 | Lucas et al. | |
| 2012/0144092 | A1 | 6/2012 | Hsieh et al. | |
| 2013/0097680 | A1 | 4/2013 | Bendapudi et al. | |
| 2014/0240335 | A1 | 8/2014 | Hu et al. | |
| 2014/0280664 | A1* | 9/2014 | Sengupta | .............. G06F 16/137 709/212 |
| 2015/0067086 | A1 | 3/2015 | Adriaens et al. | |
| 2015/0161036 | A1 | 6/2015 | Camp et al. | |
| 2015/0362983 | A1* | 12/2015 | Frick | .................... G06F 1/3287 713/324 |
| 2016/0103767 | A1* | 4/2016 | Banerjee | ............. G06F 12/0868 711/118 |
| 2016/0255169 | A1 | 9/2016 | Kovvuri et al. | |
| 2016/0266801 | A1 | 9/2016 | Marcelin Jemenez et al. | |
| 2016/0292429 | A1* | 10/2016 | Manville | ............... G06F 3/0641 |
| 2017/0091107 | A1 | 3/2017 | Peterson et al. | |
| 2017/0116130 | A1* | 4/2017 | Sundaravaradan | ......................... G06F 16/2453 |
| 2017/0277655 | A1* | 9/2017 | Das | ......................... G06F 3/061 |

OTHER PUBLICATIONS

International Search Report and Written Opinion for the Application No. PCT/US2018/041780 dated Oct. 29, 2018.

* cited by examiner

IN-MEMORY DISTRIBUTED CACHE

CROSS REFERENCE TO RELATED APPLICATIONS

This U.S. patent application is a continuation of, and claims priority under 35 U.S.C. § 120 from, U.S. patent application Ser. No. 16/865,861, filed on May 4, 2020, which is a continuation of U.S. patent application Ser. No. 15/803,416, filed on Nov. 3, 2017. The disclosures of these prior applications are considered part of the disclosure of this application and are hereby incorporated by reference their entireties.

TECHNICAL FIELD

This disclosure relates to in-memory distributed cache.

BACKGROUND

A distributed system generally includes many loosely coupled computers, each of which typically includes a computing resource (e.g., one or more processors) and/or storage resources (e.g., memory, flash memory, and/or disks). A distributed storage system overlays a storage abstraction (e.g., key/value store or file system) on the storage resources of a distributed system. In the distributed storage system, a server process running on one computer can export that computer's storage resources to client processes running on other computers. Remote procedure calls (RPC) may transfer data from server processes to client processes. Alternatively, Remote Direct Memory Access (RDMA) primitives may be used to transfer data from server hardware to client processes.

SUMMARY

One aspect of the disclosure provides a method for an in-memory distributed cache. The method includes receiving, at a memory host of a distributed storage system, a write request from a client device to write a block of client data in random access memory (RAM) of the memory host. The method also includes determining, by the memory host, whether to allow the write request by determining whether the client device has permission to write the block of client data at the memory host, determining whether the block of client data is currently saved at the memory host, and determining whether a free block of RAM is available. When the client device has permission to write the block of client data at the memory host, the block of client data is not currently saved at the memory host, and a free block of RAM is available, the write request is allowed. When the write request is allowed, the method includes allowing, at the memory host, the client to write the block of client data to the free block of RAM.

Implementations of the disclosure may include one or more of the following optional features. In some implementations, the method includes periodically determining, at the memory host, an amount of spare RAM available on the memory host. The method may also include determining, at the memory host, whether the amount of spare RAM satisfies a threshold amount comprising at least one block of free RAM. When the amount of spare RAM satisfies the threshold amount, the method may include allocating, at the memory host, at least one free block of RAM to a free block queue. Determining whether a free block of RAM is available may include determining whether at least one free block of RAM has been allocated to the free block queue. When the amount of spare RAM fails to satisfy the threshold amount, the method may further include deallocating, at the memory host, at least one free block of RAM from the free block queue. Additionally or alternatively, when the amount of spare RAM fails to satisfy the threshold amount, the method may include deleting one or more blocks of client data from the memory host. When deleting one or more blocks of client data, the method may include selecting the one or more blocks of client data for deletion according to a priority. The priority may include selecting expired low priority client data first, selecting expired high priority client data second, selecting low priority client data third, and selecting high priority client data fourth, until the amount of spare RAM satisfies the threshold amount.

In some examples, the write request includes a respective client data hash of the block of client data. Determining whether the block of data is currently saved at the memory host may include determining whether a hash map includes a mapping for the respective client data hash. After the client writes the block of client data, the method may include updating, at the memory host, a block metadata table including a hash map mapping a client data hash to the block of client data and metadata for the block of client data. The metadata may include at least one of a client identifier, a retention priority, a time to live, or a length of the client data.

In some configurations, the method includes receiving, at a network interface controller (NIC) of the memory host, a read request including a client data hash of a stored block of client data. The method may also include allowing, at the memory host, remote direct memory access (RDMA) of the stored block of client data through the NIC. In some examples, after the client writes the block of client data, the method includes validating, at the memory host, the block of client data based on a length of the block of client data or a client data hash to the block of client data. Optionally, the method may also include releasing, at the memory host, any portion of the free block of RAM between an end of the client data and an end of the free block of RAM.

Another aspect of the disclosure provides a method for an in-memory distributed cache. The method includes sending a write request from a client device to a memory host of a distributed storage system. The write request includes a client data hash to a block of client data and metadata for the block of client data. The metadata includes at least one of a client identifier, a retention priority, a time to live, or a length of the client data. The memory host is configured to determine whether to allow the write request by determining whether the client device has permission to write the block of client data at the memory host, determining whether the block of client data is currently saved at the memory host, and determining whether a free block of RAM is available. When the client device has permission to write the block of client data at the memory host, the block of client data is not currently saved at the memory host, and a free block of RAM is available, the write request is allowed. When the write request is allowed, the memory host is configured to allow the client to write the block of client data to the free block of RAM.

Implementations of this aspect of the disclosure may include one or more of the following optional features. In some implementations, the method includes identifying, at the client device, at least one memory host to receive the write request based on a proximity of the memory host relative to the client device. The method may also include determining the block of client data as low priority or high priority. The high priority may result in more replications of the block of client data than the low priority across multiple memory hosts.

In some examples, the memory host is configured to periodically determine an amount of spare RAM available on the memory host and determine whether the amount of spare RAM satisfies a threshold amount comprising at least one block of free RAM. When the amount of spare RAM satisfies the threshold amount, the memory host may be configured to allocate at least one free block of RAM to a free block queue. Determining whether a free block of RAM is available may include determining whether at least one free block of RAM has been allocated to the free block queue. When the amount of spare RAM fails to satisfy the threshold amount, the memory host may also be configured to deallocate at least one free block of RAM from the free block queue. Additionally or alternatively, when the amount of spare RAM fails to satisfy the threshold amount, the memory host may be configured to delete one or more blocks of client data from the memory host. When the memory host is configured to delete one or more blocks of client data, the memory host may also be configured to select the one or more blocks of client data for deletion based on the retention priority of the metadata according to a priority. The priority may include selecting expired low priority client data first, selecting expired high priority client data second, selecting low priority client data third, and selecting high priority client data fourth, until the amount of spare RAM satisfies the threshold amount.

In some configurations, determining whether the block of data is currently saved at the memory host includes determining whether a hash map includes a mapping for the respective client data hash. After the client writes the block of client data, the method may include updating, at the memory host, a block metadata table. The block metadata table may include a hash map mapping the client data hash to the block of client data and metadata for the block of client data.

In some implementations, the memory host is configured to receive, at a network interface controller (NIC) of the memory host, a read request including the client data hash of a stored block of client data. The memory host may also be configured to allow remote direct memory access (RDMA) of the stored block of client data through the NIC. Optionally, after the client writes the block of client data, the memory host may be further configured to validate the block of client data based on a length of the block of client data or the client data hash to the block of client data. In some examples, the memory host is further configured to release any portion of the free block of RAM between an end of the client data and an end of the free block of RAM.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
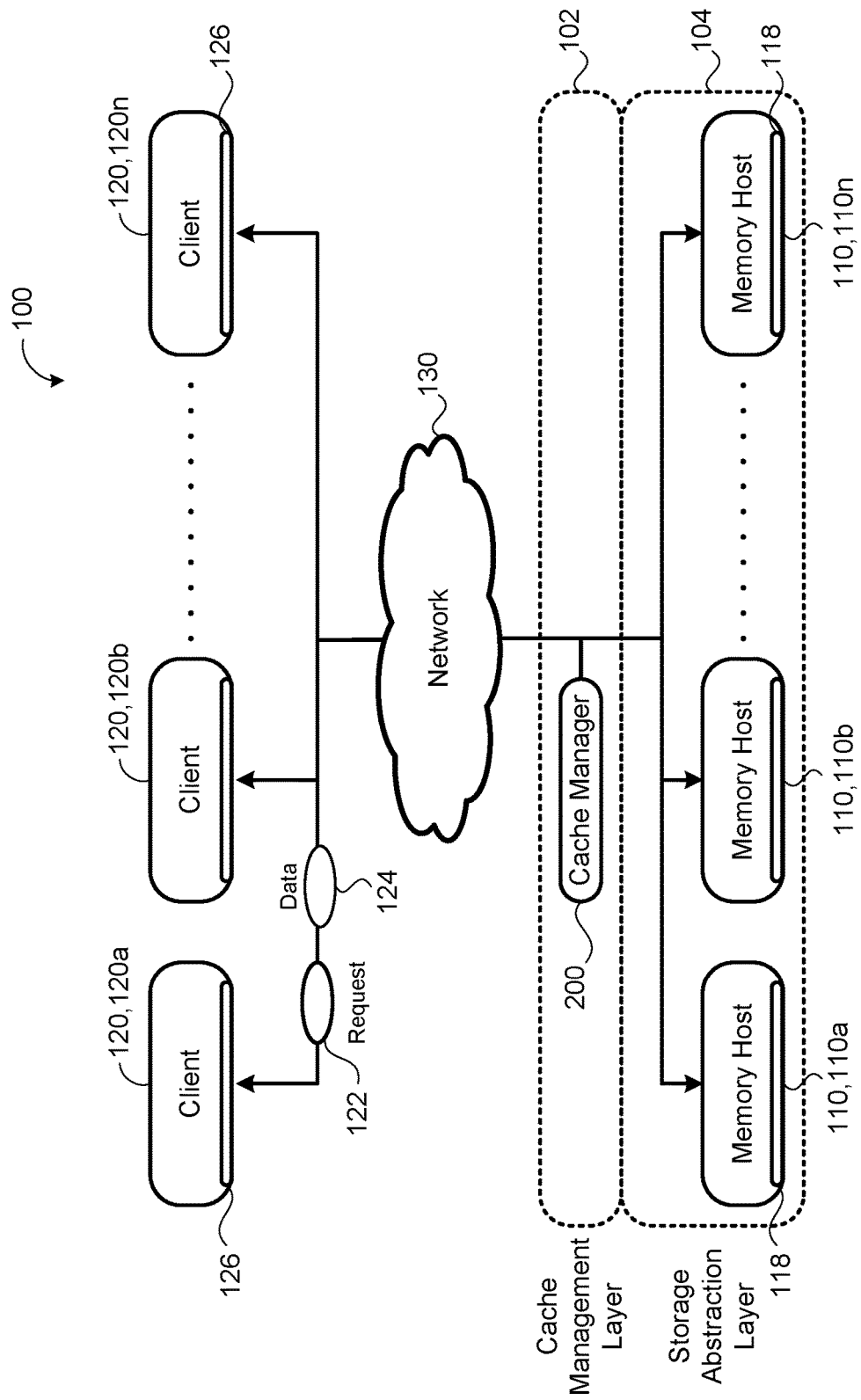
FIG. 1A is a schematic view of an example distributed storage system.
Figure 1B:
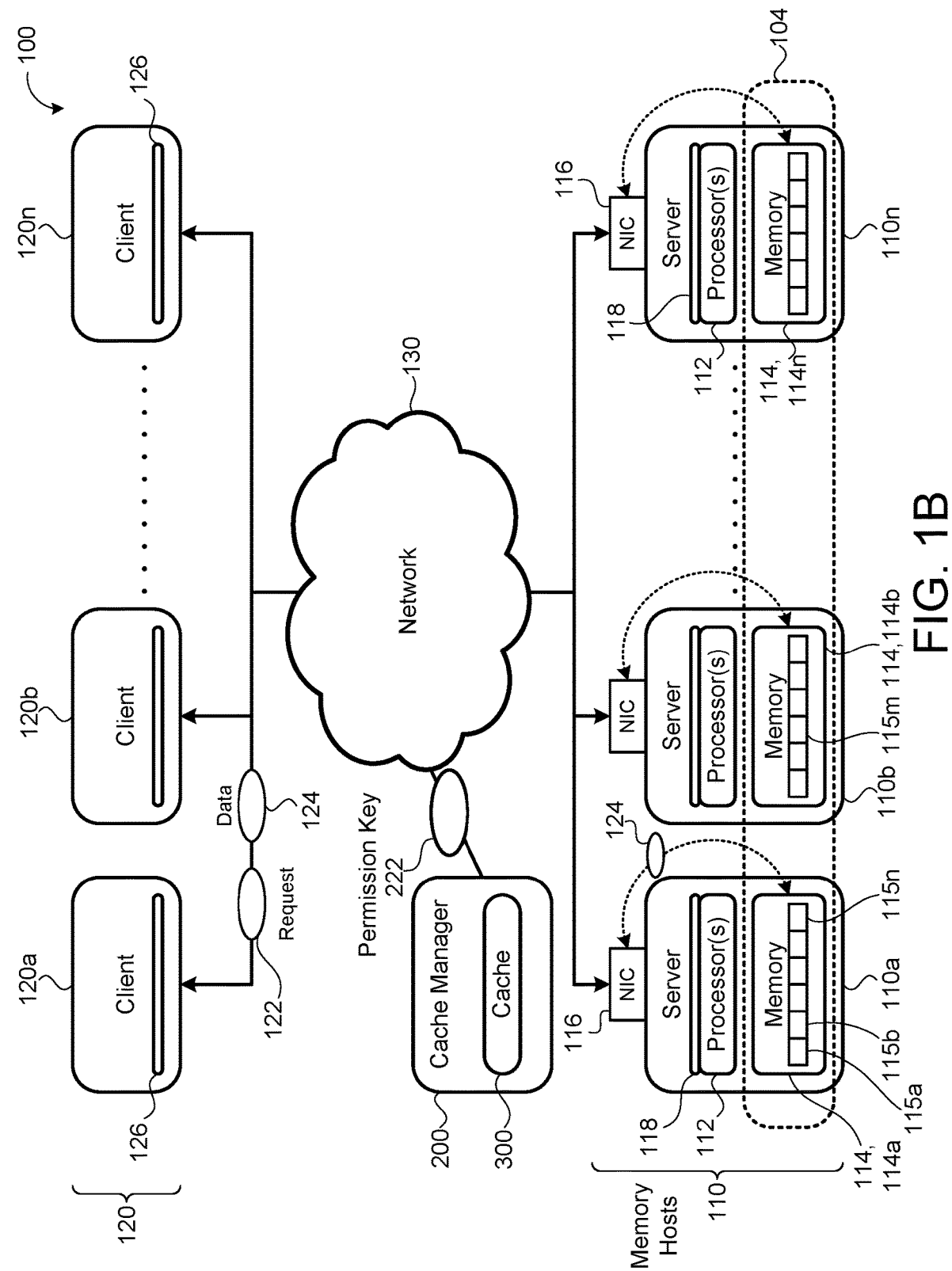
FIG. 1B is a schematic view of an example distributed storage system having a cell of memory hosts.

Data centers house computer systems and their associated components, such as telecommunications and storage systems 100 (FIGS. 1A-1B). Data centers may be located in different geographical locations (e.g., different cities, different countries, and different continents) and generally include many servers to execute various client processes. Although data centers attempt to prioritize processes based on whether the process is a customer facing job, a batch job, or a free job, computing systems often underutilize their associated computing resources (e.g., central processing units ("CPUs") and memory ("RAM")). For example, with regards to storage resources, larger data centers have observed that their computing systems do not use utilize portions of their RAM, at the ninety-fifth-percentile of usage and/or that routinely portions of their RAM remains idle.

To more effectively and efficiently utilize storage resources, software services may cache large amounts of data in RAM. Caches may be formed within a server (i.e. in-process) or run as a separate service shared between multiple instances of a service (i.e. out-of-process). However, a potential concern with caches is that the unused (i.e. free) storage resources forming a cache may need to be later user by the computing system for client processes; thus, affecting cache durability. Even though caches are not durable, caches may accelerate computing by storing data likely to be accessed again in the near future; therefore, preventing reading data again from disk and/or potentially resource expensive re-calculations. Therefore, it is desirable to provide a cache that accounts for the ever changing processing demands of a distributed storage system 100.

Referring to FIGS. 1A-1B, in some implementations, a distributed storage system 100 includes loosely coupled memory hosts 110, 110*a-n* (e.g., computers or servers), each having a computing resource 112 (e.g., one or more processors or central processing units (CPUs)) in communication with storage resources 114 (e.g., memory, flash memory, dynamic random access memory (DRAM), phase change memory (PCM), and/or disks) that may be used for caching data. A storage abstraction (e.g., key/value store or file system) overlain on the storage resources 114 allows scalable use of the storage resources 114 by one or more clients 120, 120*a-n*. The clients 120 may communicate with the memory hosts 110 through a network 130 (e.g., via remote programming calls (RPCs)).

In some implementations, the distributed storage system 100 is "single-sided," eliminating the need for any server jobs for responding to remote procedure calls (RPC) from clients 120 to store or retrieve data 124 on their corresponding memory hosts 110 and may rely on specialized hardware to process remote requests 122 instead. "Single-sided" refers to the method by which request processing on the memory hosts 110 may be done in hardware rather than by software executed on CPUs 112 of the memory hosts 110. Rather than having a processor 112 of a memory host 110 (e.g., a server) execute a server process 118 that exports access of the corresponding storage resource 114 (e.g., non-transitory memory) to client processes 126 executing on the clients 120, the clients 120 may directly access the storage resource 114 through a network interface controller (NIC) 116 of the memory host 110. In other words, a client process 126 executing on a client 120 may directly interface with one or more storage resources 114 without requiring execution of a routine of any server processes 118 executing on the computing resources 112. This single-sided distributed storage architecture offers relatively high-throughput and low latency, since clients 120 can access the storage resources 114 without interfacing with the computing resources 112 of the memory hosts 110. This has the effect of decoupling the requirements for storage 114 and CPU 112 cycles that typical two-sided distributed storage systems 100 carry. The single-sided distributed storage system 100 can utilize remote storage resources 114 regardless of whether there are spare CPU 112 cycles on that memory host 110; furthermore, since single-sided operations do not contend for server CPU 112 resources, a single-sided system 100 can serve cache requests 122 with very predictable, low latency, even when memory hosts 110 are running at high CPU 112 utilization. Thus, the single-sided distributed storage system 100 allows higher utilization of both cluster storage 114 and CPU resources 112 than traditional two-sided systems, while delivering predictable, low latency.

Additionally or alternatively, the distributed storage system 100 can utilize a traditional two-sided distributed storage system 100 where the clients 120 can access both the computing resources 112 and the storage resources 114 or a hybrid of a two-sided system and a single sided system. For example, when the request 122 is related to write operations, the client 120 can access the computing resources 112 to write to the storage resources 114. Yet when the request 122 corresponds to read operations, the client 120 can bypass the computing resources 112 to the storage resources 114 (e.g., via a NIC 116) similar to a single-sided distributed storage system 100.

In some implementations, the distributed storage system 100 includes a cache management layer 102 and a storage abstraction layer 104. The cache management layer 102 may include a cache manager 200 that is responsible for accessing the underlying data, for example, via RPC or single-sided operations. The cache management layer 102 may manage allocation and access to storage resources 114 with tasks, such as allocating storage resources 114, registering storage resources 114 with the corresponding network interface controller 116 or computing resources 112, setting up connections between the client(s) 120 and the memory hosts 110, etc. The storage abstraction layer 104 may include the loosely coupled memory hosts 110, 110a-n.

The distributed storage system 100 may store data 124 in dynamic random access memory (DRAM) 114 and serve the data 124 from the remote hosts 110 via remote direct memory access (RDMA)-capable network interface controllers 116. Additional implementation details and features on RDMA are disclosed in U.S. Pat. No. 8,676,851, which is hereby incorporated by reference in its entirety. The RDMA may transfer or allow access to stored data (e.g., client data 124) through a network interface controller 116 (also known as a network interface card, network adapter, or LAN adapter). The network interface controller 116 may be a computer hardware component that connects a computing resource 112 to the network 130. Both the memory hosts 110a-n and the client 120 may each have a network interface controller 116 for network communications. A host process 118 executing on the computing processor 112 of the memory host 110 registers a set of remote direct memory accessible regions 115a-n of the memory 114 with the network interface controller 116. The host process 118 may register the remote direct memory accessible regions 115a-n of the memory 114 with a permission of read-only or read/write. The network interface controller 116 of the memory host 110 may create a client key for each registered memory region 115a-n.

The single-sided operations performed by the network interface controllers 116 may be limited to simple reads, writes, and compare-and-swap operations, none of which may be sophisticated enough to act as a drop-in replacement for the software logic implemented by a traditional cache server job to carry out cache requests and manage cache policies. The cache manager 200 translates commands, such as look-up or insert data commands, into sequences of primitive network interface controller operations. The cache manager 200 interfaces between clients 120 and the storage abstraction layer 104 of the distributed storage system 100.

The distributed storage system 100 may include a co-located software process to register memory 114 for remote access with the network interface controllers 116 and set up connections with client processes 126. Once the connections are set up, client processes 126 can access the registered memory 114 via engines in the hardware of the network interface controllers 116 without any involvement from software on the local CPUs 112 of the corresponding memory hosts 110.

Referring to FIG. 1B, in some implementations, the distributed storage system 100 includes multiple clients 120a-n, each client 120 interacts with the memory hosts 110 through the network 130 with the cache manager 200. The cache manager 200 is configured to manage a cache table 300 for data related to the memory resources 114 of the memory hosts 110. The cache manager 200 may run on each memory host 110 or on a separate host machine. In some examples, the cache manager 200 may execute on a computing processor (e.g., server having a non-transitory memory) connected to the network 130 and manage the data storage, control data placements, and/or initiate data reallocation. Moreover, the cache manager 200 may track an existence and storage location of data (e.g., client data 124) on the memory hosts 110. The distributed storage system 100 may include multiple cache managers 200 accessible clients 120 based on their requests 122. In some implementations, the cache manager(s) 200 track the striping of data across multiple memory hosts 110 and the existence and/or location of multiple copies of a given stripe for redundancy and/or performance. In computer data storage, data striping is the technique of segmenting logically sequential data in a way that accesses of sequential segments are made to different physical storage devices 114 (e.g., memory hosts 110). Striping is useful when a processing device requests access to data more quickly than a storage device 114 can provide access. By performing segment accesses on multiple devices, multiple segments can be accessed concurrently. This provides more data access throughput, which avoids causing the processor to idly wait for data accesses.

Figure 1C:
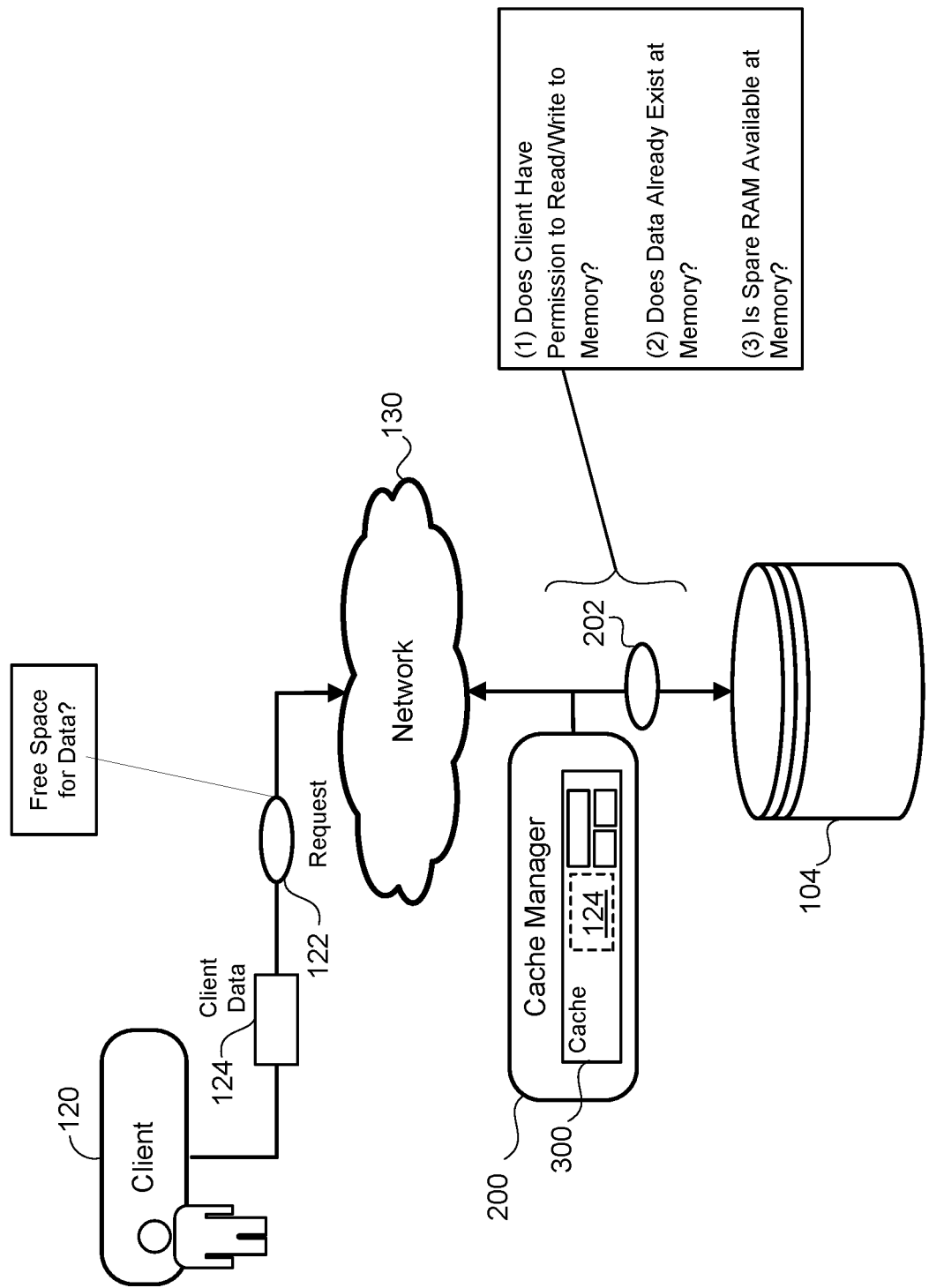
FIG. 1C is a schematic view of an example cache manager interacting with a distributed storage system.

As depicted by FIG. 1C, in some implementations, the cache manager 200 interfaces between a client 120 (e.g., with the client requests 122) and the storage abstraction layer 104. In some examples, the client 120 communicates with the cache manager 200 through one or more remote procedure calls (RPC). Here, the communication is designated by the client request 122. The request 122 may be a write request from the client 120 (or client device 120) to write a block of client data 124 in RAM 114 of the memory host 110. Additionally or alternatively, the request 122 may be a read request from the client 120 to read a block of client data 124 from the RAM 114 of the memory host 110 (e.g., a "get" or a retrieval function). In response to the client request 122, the cache manager 200 is configured to determine whether to allow the client request 122.

In some examples, a proxy receives the request 122 and determines whether to allow the request 122. The proxy may be related to the cache manager 200 or independent of the cache manager 200. One advantage of the proxy is that the proxy may function as a filter to determine whether to allow the request 122 via filter criteria (e.g., permissions, existence of data, availability of resources, etc.). When the proxy functions as a filter, the proxy may then forward the request 122 to memory hosts 110 of the distributed storage system 100 once the request 122 satisfies some or all filter criteria.

As depicted in FIG. 1C, the cache manager 200 may send a query 202 to the storage abstraction layer 104 to determine whether to allow the client request 122. In some examples, the cache manager 200 determines whether to allow the client request 122 by determining at least the following: whether the client 120 has permission for the request 122; whether the block of client data 124 exists at the storage abstraction layer 104 (e.g., currently saved at the memory host 110); and whether spare memory is available at the storage abstraction layer 104. FIG. 1C illustrates that the query 202 may be initiated by the client 120 asking the request 122 of whether free space (e.g., at memory) is available for corresponding client data 124. When the query 202 results that the client 120 has permission for the request 122, that the block of client data 124 is not currently saved within the storage abstraction layer 104, and the spare storage resources 114 (e.g., spare RAM) are available at the storage abstraction layer 104 for the corresponding client data 124, the cache manager 200 and/or storage abstraction layer 104 allows the request 122. In some examples, by allowing the request 122, the cache manager 200 writes the client data 124 to a free block $114_F$ of RAM. In other examples, by allowing the request 122, the cache manager 200 reads the client data 124 from a storage location corresponding to where the client data 124 has been written. The cache manager 200 may write the client data 124 to a free block of RAM within a cache table 300. FIG. 1C, for example, depicts the client data 124 with a dotted line within the cache table 300 to indicate the client data 124 written to or stored within for read access to the cache table 300. The cache table 300 of the cache manager 200 is generally configured to correspond with available (i.e. free blocks $114_F$ of RAM) storage resources 114 within the storage abstraction layer 104. In some examples, the query 202 by the cache manager 200 permits a memory host 110 of the storage abstraction layer 104 to decide whether to allow the client request 122. Additionally or alternatively, the cache manager 200 may provide encryption and/or compression related to a request 122 (e.g., when writing to memory hosts 110 or when reading from memory hosts 110). For example, a cache manager 200 implemented in silicon (e.g., part of a network switch) performs encryption and/or compression in real-time for a request 122. In other examples, a cache manager 200 is configured to manage computational resources such that encryption and/or compression is optional or performed selectively.

Figure 2A:
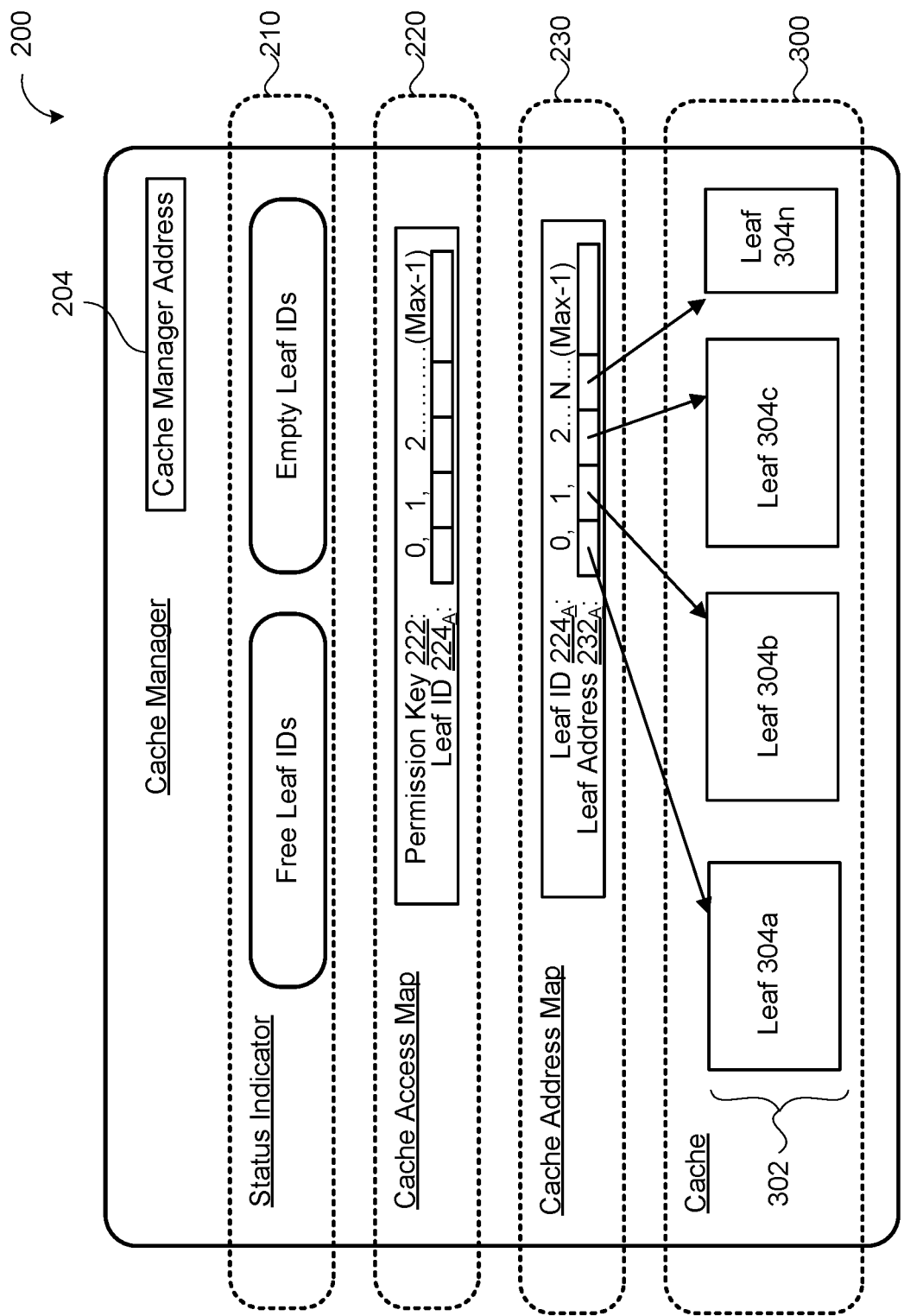
FIGS. 2A and 2B are schematic views of example cache managers.
Figure 2B:
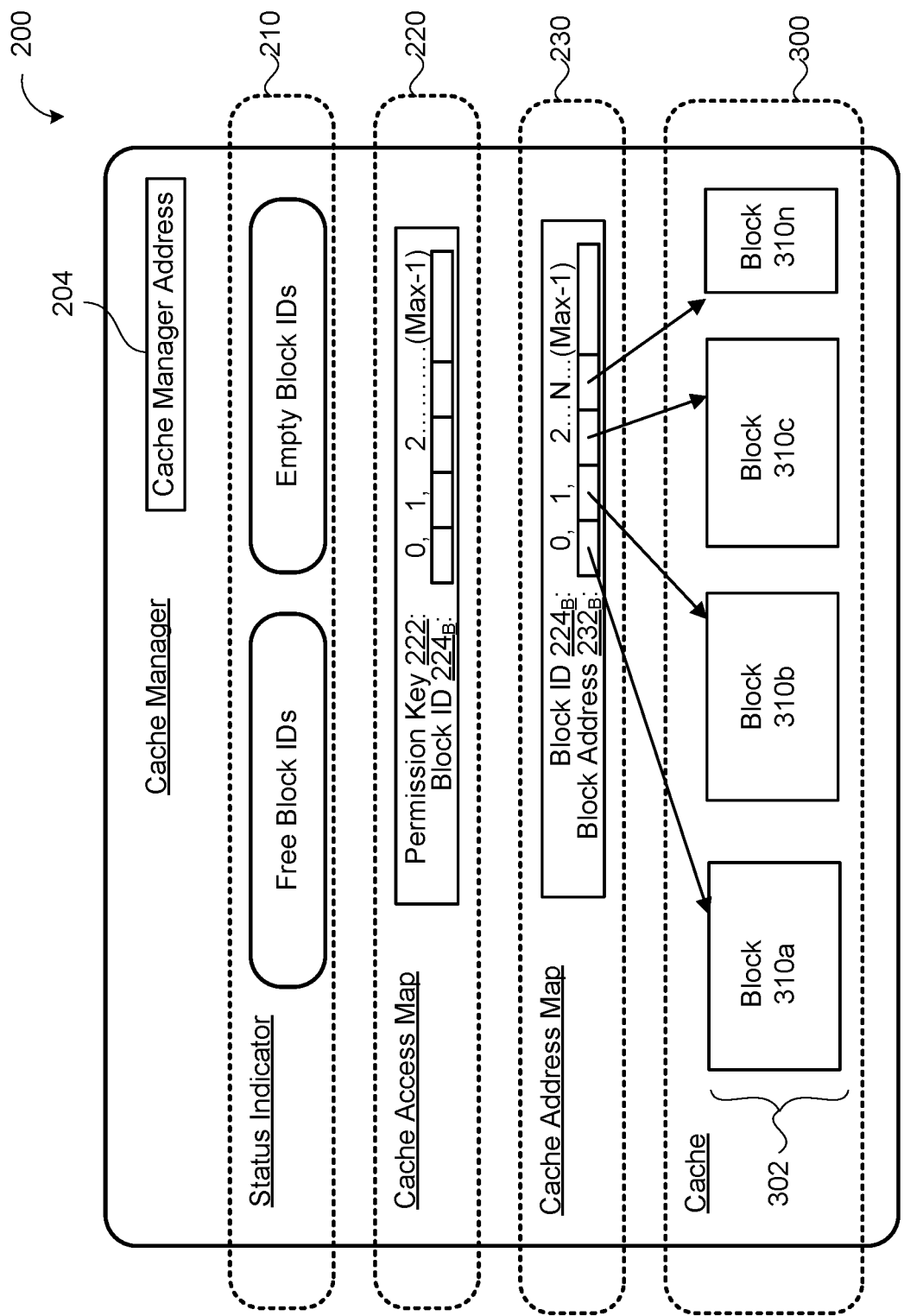

FIGS. 2A and 2B are examples of a cache manager 200. In some implementations, the cache manager 200 includes a status indicator 210, cache map(s) (e.g., a cache access map 220 and a cache address map 230), and a cache table 300. The cache manager 200 may be software, such as a program or a network service. For example, the cache manager 200 is a daemon available to all clients 120 related to the distributed storage system 100. The cache manager 200 may be an out-of-process service shared between clients 120. The distributed storage system 100 may include more than one cache manager 200. With more than one cache manager 200, each cache manager 200 may operate independently such that a first cache manager 200, 200a does not communicate with a second cache manager 200, 200b. Each cache manager 200 of the distributed storage system 100 includes a cache manager address 204 as a form of identification. The cache manager address 204 enables a first client 120, 120a to communicate a means of identification for a cache manager 200 to a second client 120, 120b. The cache manager address 204 may also allow a client 120 consistent placement of client data 124, because the client 120 may consistently request a same cache manager 200 with a given cache manager address 204 to manage the client data 124.

Each cache manager 200 includes the cache table 300 that corresponds to blocks of storage resources 114 (e.g., RAM) available at the storage abstraction layer 104. In other words, the available storage resources 114 at the storage abstraction layer 104 include a number of free blocks $114_F$ of RAM. Each free block $114_F$ of RAM corresponds to an amount of spare RAM available at memory hosts 110 of the distributed storage system 100. Based on the free blocks $114_F$ of RAM, the cache table 300 includes a queue 302. As depicted in FIG. 2A, the queue 302 may include a leaf abstraction layer with a number "n" of leaves 304a-n. Each leaf 304 within the queue 302 may correspond to a set size of data storage controlled by the cache manager 200. The number of leaves "n" within a queue 302 of the cache table 300 depends on the amount of spare RAM available at memory hosts 110. In other examples, the queue 302 of the cache manager 200 includes blocks 310a-n. FIG. 2B is one such example where an operating system maps RAM to address space without a leaf abstraction layer. In this regard, FIGS. 2A and 2B may function similarly except that indicators, identifiers, and/or addresses may refer to leaves (e.g., generally designated with a "A" subscript) or blocks (e.g., generally designated with a "B" subscript).

In some examples, the cache manager 200 facilitates the cache table 300 by the status indicator 210 and the cache maps 220, 230. Each cache map 220, 230 may be an array having a length proportional to a number of identifiers ("ID") (e.g., leaf IDs $224_A$ and block IDs $224_B$). Referring to examples FIGS. 2A and 2B, the cache access map 220 is configured to map a permission key 222, such as a spinlock, to an ID 224. The ID 224 is an assigned identifier (e.g., uniform resource identifier (URI), uniform resource locator (URL), and/or uniform resource name (URN)) for a leaf 304 or a block 310 within the cache table 300. For each cache manager 200, the IDs 224 may be a range of values, such as numbers, letters, or alphanumerics, assigned to identify each leaf 304 (or block 310) within the cache manager 200. As a basic example, the leaf ID $224_A$ ranges from 1 to a maximum leaf ID. The leaf ID $224_A$ may be programmed for a custom range or a range that dynamically relates to the available storage resources 114 of the distributed storage system 100. In some implementations, an ID 224 within a range of IDs 224 is reserved to indicate that a storage location (e.g., a leaf 304 or a block 310) with a particular ID 224 does not exist. In other words, when a client 120 references a leaf ID $224_A$, the cache manager 200 may indicate that the referenced leaf ID $224_A$ does not exist (e.g., returns "DNE").

As depicted in FIGS. 2A and 2B, each ID 224 may be paired with a corresponding permission key 222. The corresponding permission key 222 generally enables shared resources, such as data within a cache manager 200, to be accessed (e.g., by multiple clients 120 to be read) and to be shared without changing the resource itself (e.g., writing to the resource). This may be an advantage for an out-of-process cache manager 200. For example, the permission key 222 is configured to protect writes to the ID 224 to address mapping. In some examples, each permission key 222 is a spinlock, such as a cooperative reader/writer spinlock. For example, the permission key 222 corresponding to a leaf ID $224_A$ mapped to a leaf address $232_A$ that corresponds to a leaf 304 may restrict more than one client 120 to write to blocks 310 within the leaf 304 without first acquiring the permission key 222 of the leaf 304. In some implementations, when the client data 124 exists within a leaf 304, the request 122 for writing the client data 124 includes the permission key 222 corresponding to the client data 124. An inherent advantage of this permission key 222 is therefore protecting the client data 124 within a leaf 304. In some examples, such as a spinlock, when the client 120 acquires the permission key 222, the client 120 must release the permission key 222 after utilizing the corresponding resource (e.g., the leaf 304, a block 310 of the leaf 304, or the client data 124 within the leaf 304). Otherwise, in these examples, other clients 120 can be locked out of the leaf 304 corresponding to the permission key 222. In some configurations, the permission key 222 is a hash that functions as a client data identifier. For example, a hash function with a hash value (e.g., 256 bits) prevents one client from storing client data 124 within an occupied block of the cache table 300 without the same hash corresponding to the client data 124 in the occupied block.

In some examples, the cache address map 230 maps the ID 224 (e.g., explained above) to an address 232. The address 232 may be any address assigned as a storage location or reference location for a given leaf 304 (e.g., URI, URL, or URN). The cache address map 230 maps, for each leaf 304 of the cache table 300, a leaf address $232_A$ to a leaf ID $224_A$. In addition to the permission key 222, the client 120 and/or cache manager 200 may validate (e.g., lookup) that the cache address map 230 includes a valid address 232 from the corresponding ID 224. In some examples, this validation step according to the cache address map 230 permits the client 120 to reference data (e.g., client data 124) within the leaf 304 or block 310.

In some configurations, the status indicator 210 tracks management of storage resources related to the cache table 300. In these configurations, the cache manager 200 is configured to provide information for each leaf 304 or block 310, such as a permission key 222, an ID 224, and an address 232. The status indicator 210 may indicate to the client 120 that interacts with the cache manager 200, unassigned IDs 224 (i.e. free leaf IDs) of the range of IDs 224 along with IDs 224 that have been assigned, but are no longer storing data (i.e. empty IDs). In this respect, the status indicator 210 may help the client 120 decide which cache manager 200 to request by understanding a load of each cache manager 200. Additionally or alternatively, the status indicator 210 may enable the cache manager 200 to update, to allocate, or to deallocate data and leaf information within the cache manager 200.

Figure 3A:
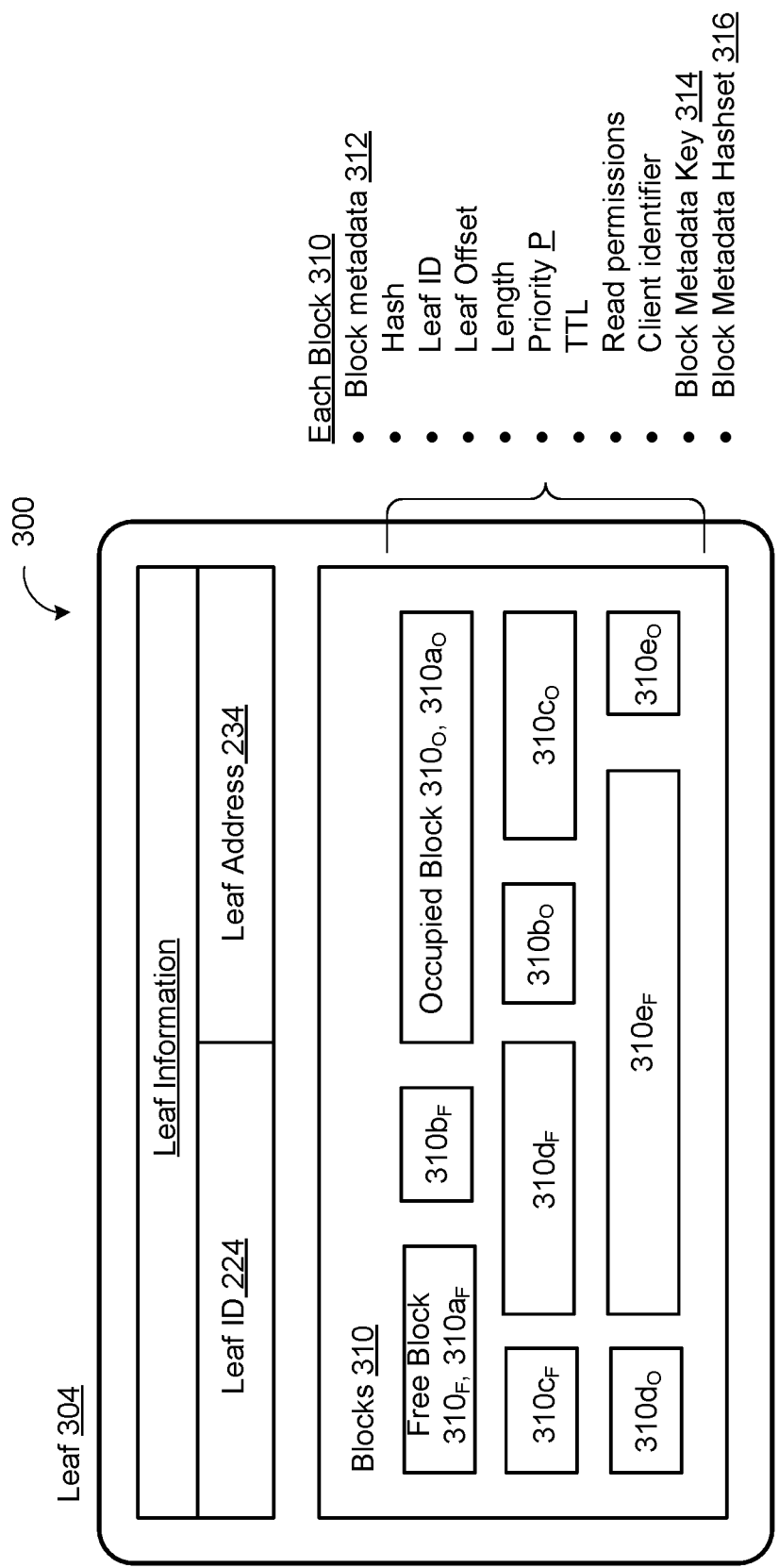
FIGS. 3A-3C are schematic views of an example cache of a cache manager.
Figure 3B:
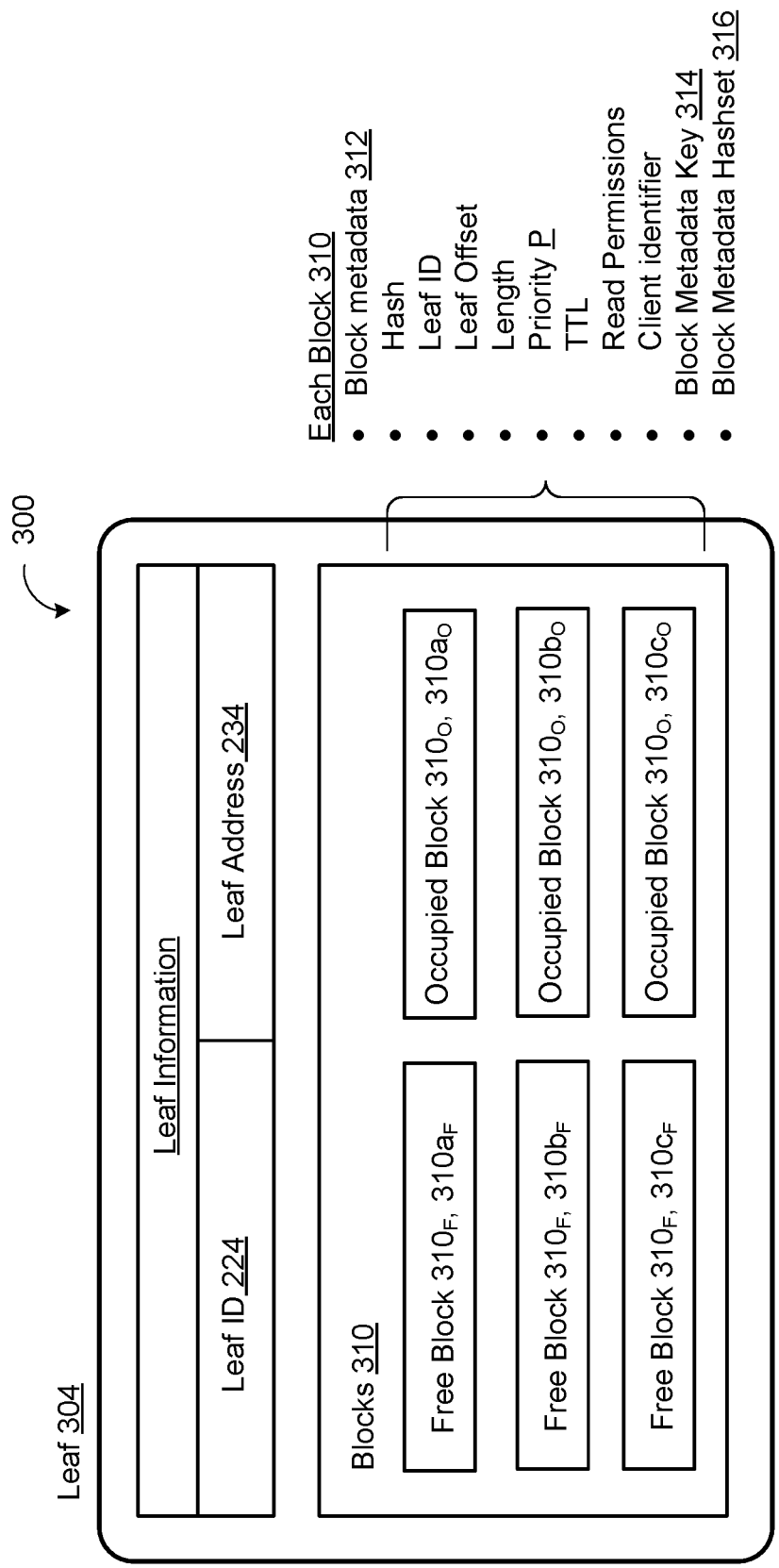
Figure 3C:
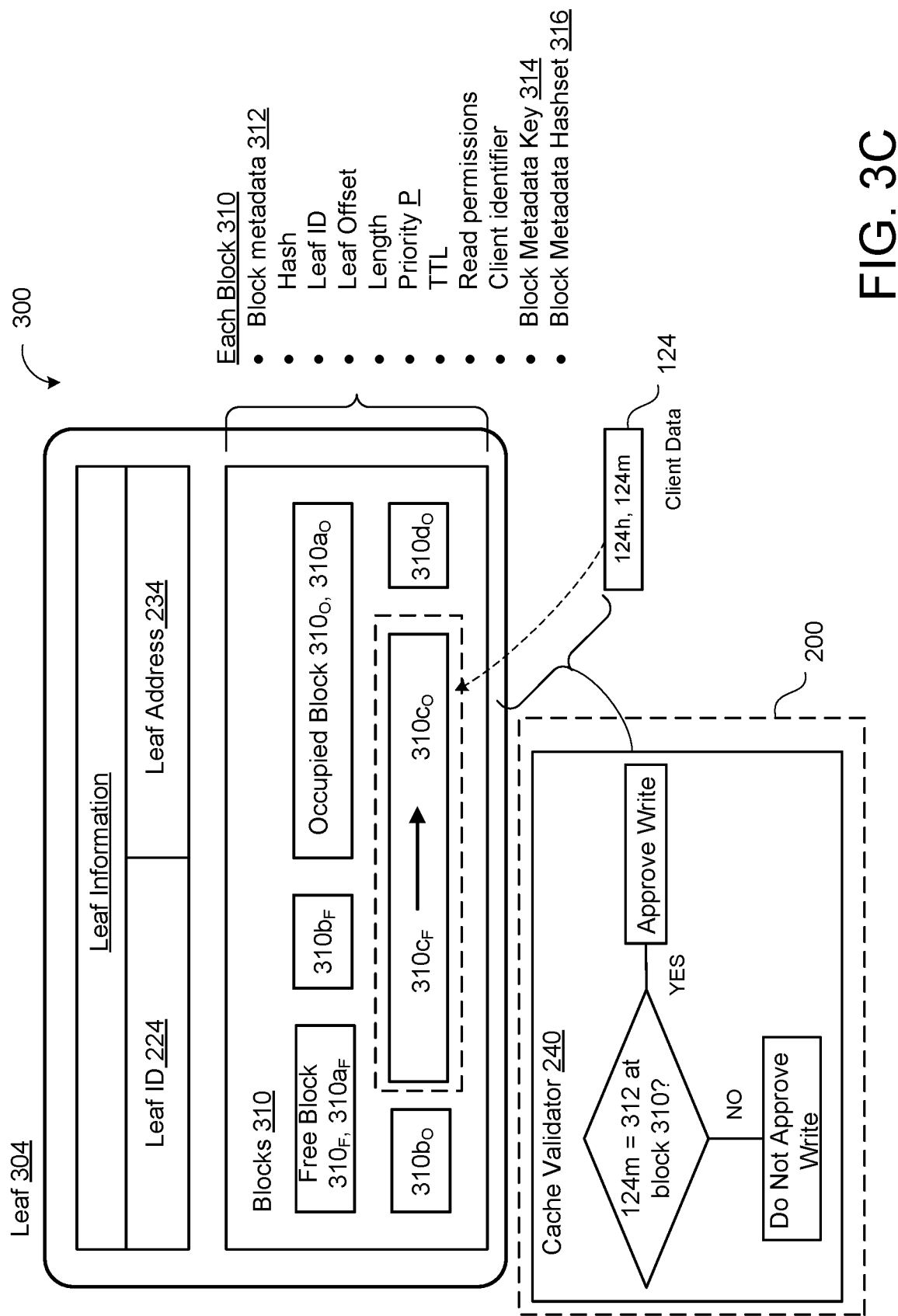

FIG. 3A-3C are examples of a leaf 304 within the cache table 300 of the cache manager 200. As discussed above, the leaf 304 is allocated by the cache manager 200 based on the free blocks $114_F$ of RAM available within the distributed storage system 100. In other words, the number "n" of leaves 304a-n depends of the available storage resources 114. Accordingly, the cache manager 200 may allocate more leaves 304 within the cache table 300 when the amount of spare RAM within the memory hosts 110 increases. Similarly, when the computing processing increases, the cache manager 200 may deallocate (e.g., remove and delete) leaves 304 within the cache table 300 because the amount of spare RAM within the memory hosts 110 has decreased to compensate for the computing processing increases. As depicted in this example, each leaf 304 includes leaf information, such as a leaf ID $224_A$ and a leaf address 234. Each leaf 304 may further include storage blocks 310 of variable size less than a set size of the leaf 304. In some examples, the size of the leaf 304 is a uniform size (e.g., 64 MiB long) or a multiple of the uniform size. In other examples, the cache manager 200 is programmed to allocate leaves 304a-n of any size depending on design parameters (e.g., a desired headroom, the threshold amount $F_{thresh}$, and/or the at least one free block $114_F$). Generally, the leaf 304 may be free (i.e. an empty leaf) or occupied with data (e.g., the client data 124) allocated by the cache manager 200. In some examples, when occupied with data, the leaf 304 includes storage blocks 310. In some implementations, the number of blocks 310 and the size (e.g., number of chunks) of each block 310 depends on the allocation of client data 124 by the cache manager 200. In other implementations, such as FIG. 3B, each block 310 is a designated uniform size (e.g., uniform number of chunks). In some examples, each block 310 is a multiple of the designated uniform size. As the use of storage resources 114 within the storage abstraction layer 104 is fluid, previously allocated and occupied blocks $310a_O$-$n_O$ within the leaf 304 may become free blocks $310a_F$-$n_F$. For example, FIG. 3A illustrates five free cache blocks $310_F$, $310a_F$-$e_F$ of varying sizes and five occupied blocks $310_O$, $310a_O$-$e_O$ of varying sizes.

Each occupied block $310_O$ within the leaf 304 may include block metadata 312, a block metadata key 314, and a block metadata hash set 316 as shown in examples FIGS. 3A-3C. When the cache manager 200 allocates client data 124 to a free cache block $310_F$ within the leaf 304, the cache manager 200 may map client metadata 124m associated with the client data 124 to the block metadata 312. Some examples of block metadata 312 include a hash, a leaf ID $224_A$, a leaf offset, a length, a priority P (e.g., high priority $P_{high}$, low priority $P_{low}$), a time to live (TTL), and read permissions. In some examples, the cache manager 200 maps metadata associated with the client data 124 to the block metadata 312 with the block metadata hash set 316. The metadata associated with the client data 124 may be client information, such as who the client is or other sourcing information. Generally, the block metadata hash set 316 is a hash map such as a standard hash table.

Additionally or alternatively, client metadata 124m and/or corresponding block metadata 312 may be modified by a request 122, such as a write request. Some examples of these modifications are that the client 120 modifies the priority P or time to live TTL of the client data 124 (e.g., after an initial write request for the client data 124). In other words, the client 120 may change the priority P of the client data 124 from a high priority $P_{high}$ to a low priority $P_{low}$. In some examples, the client 120 defines client metadata 124m related to client data 124 at a time of a request 122 (e.g., initial request with the cache manager 200). In other examples, the client 120 opts to identify and/or modify the client metadata 124m based on requests 122 related to the client data 124 (e.g., requests 122 for the client data 124). Here, a client 120 identifies a number of requests 122 related to the client data 124 and may modify the time to live TTL or priority P. This may allow clients 120 to update and to prioritize client data 124 according to request activity. For example, a client 120 later realizes that a resource related to the client data 124 is more important (e.g., subject to more requests 122) or less important (e.g., subject to less requests 122). Additionally or alternatively, the cache manager 200 is configured to modify block metadata 312 corresponding to client metadata 124m based requests 122. When the cache manager 200 modifies or determines various block metadata 312, the cache manager 200 may operate independent of further input from the client 120 regarding the client data 124. Moreover, modification generally has an advantage that it may permit the related block metadata 312 to be dynamic and/or potentially prevent the cache manager 200 from deleting or removing client data 124 that increases in value.

As a form of protection, the block metadata key 314 is configured to guard the block metadata 312 and/or the corresponding block metadata hash set 316 to ensure thread safety. The block metadata key 314 may operate similar to the permission key 222 such that a unique name or ID is obtained by the client 120 to lock the block metadata 312 from other threads while the block metadata 312 in use (e.g., being written and/or read). One such example of a block metadata key 314 is a mutex.

Referring to FIG. 3C, the cache manager 200 is configured to write the client data 124 with the client data hash 124h and client metadata 124m to the free cache block $310_F$, $310a_F$ upon request 122 of the client 120. Here, once allocated, the free cache block $310_F$, $310a_F$ becomes an occupied block $310_O$ with block metadata 312 corresponding to client metadata 124m of the allocated client data 124. In some examples, such as FIG. 3C, the cache manager 200 further includes a cache validator 240. After the client 120 and/or the cache manager 200 writes the block of client data 124 to generate the occupied block $310c_O$, the cache validator 240 is configured to validate the client metadata 124m and/or the client data hash 124h with the block metadata 312. Although any block metadata 312 may be validated by the cache validator 240 against the client metadata 124m and/or client data hash 124h, one such example entails the cache validator 240 validating the client metadata 124m based on a length of the client data 124. In some examples, the cache validator 240 is configured to approve the request 122 (e.g., write request or read request) based on the validation of metadata discussed above as shown in FIG. 3C.

FIGS. 4A-4E are examples where the cache manager 200 further includes a cache allocator 250 and/or a cache deallocator 260. In some examples, the cache manager 200 is configured to determine the amount of spare RAM available on the memory host 110. The cache manager 200 may be configured to independently determine the amount of spare RAM or utilize a thread (e.g., from operating systems of the distributed storage system 100) that checks a level of free memory $114_F$ within the storage abstraction layer 104. In either configuration, the cache manager 200 may use a status request 206 to determine the amount of spare RAM (e.g., the number of free blocks $114_F$ of RAM). The status request 206 may occur at a set frequency (e.g., 40 Hz), periodically, or according to triggering functions, such as cache manager functions or processing functions of the distributed storage system 100. For example, as an extreme case, the status request 206 is triggered by an out of memory kill process.

Figure 4A:
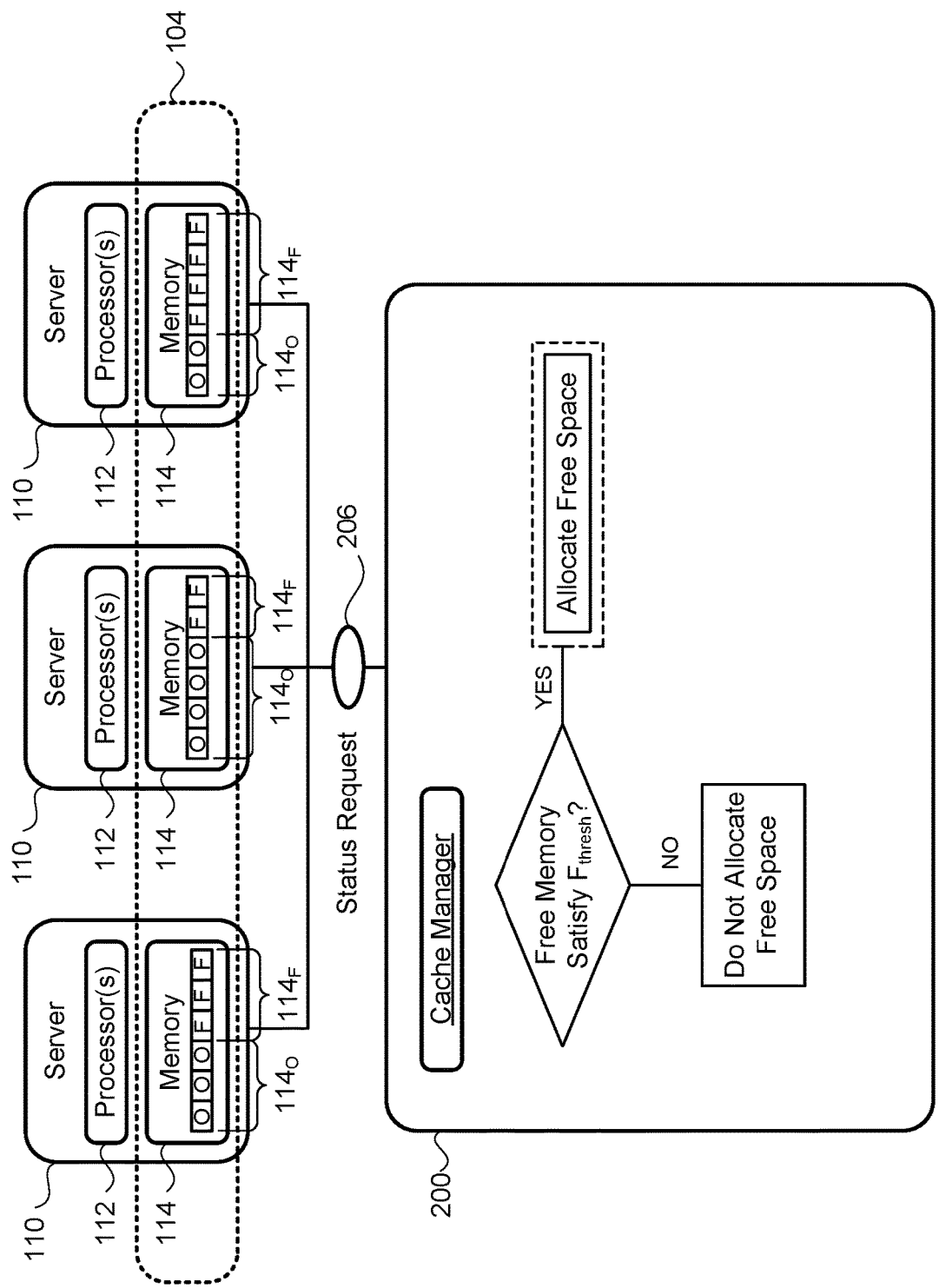
FIGS. 4A and 4B are schematic views of an example cache allocator.
Figure 4B:
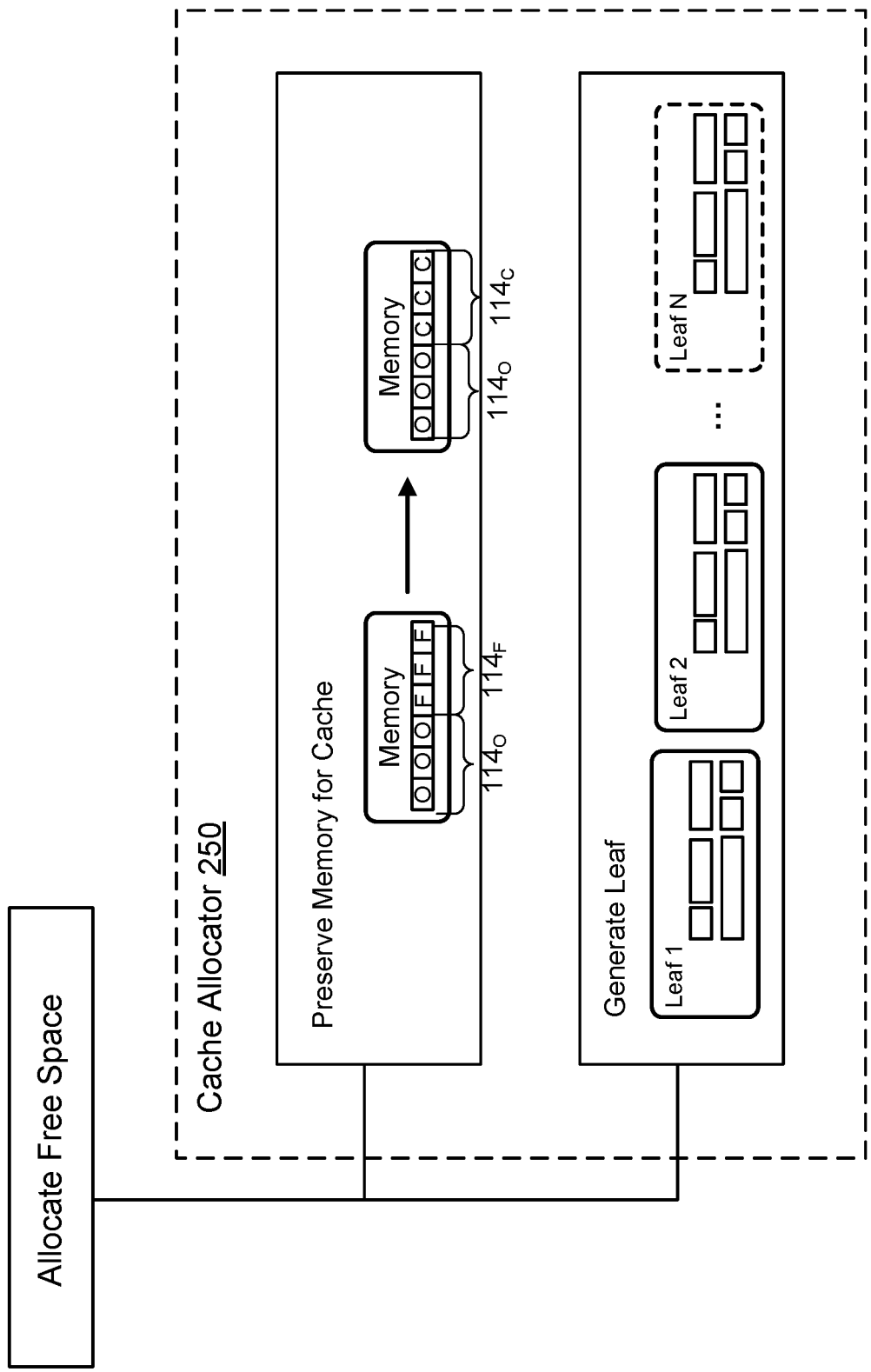
Figure 4C:
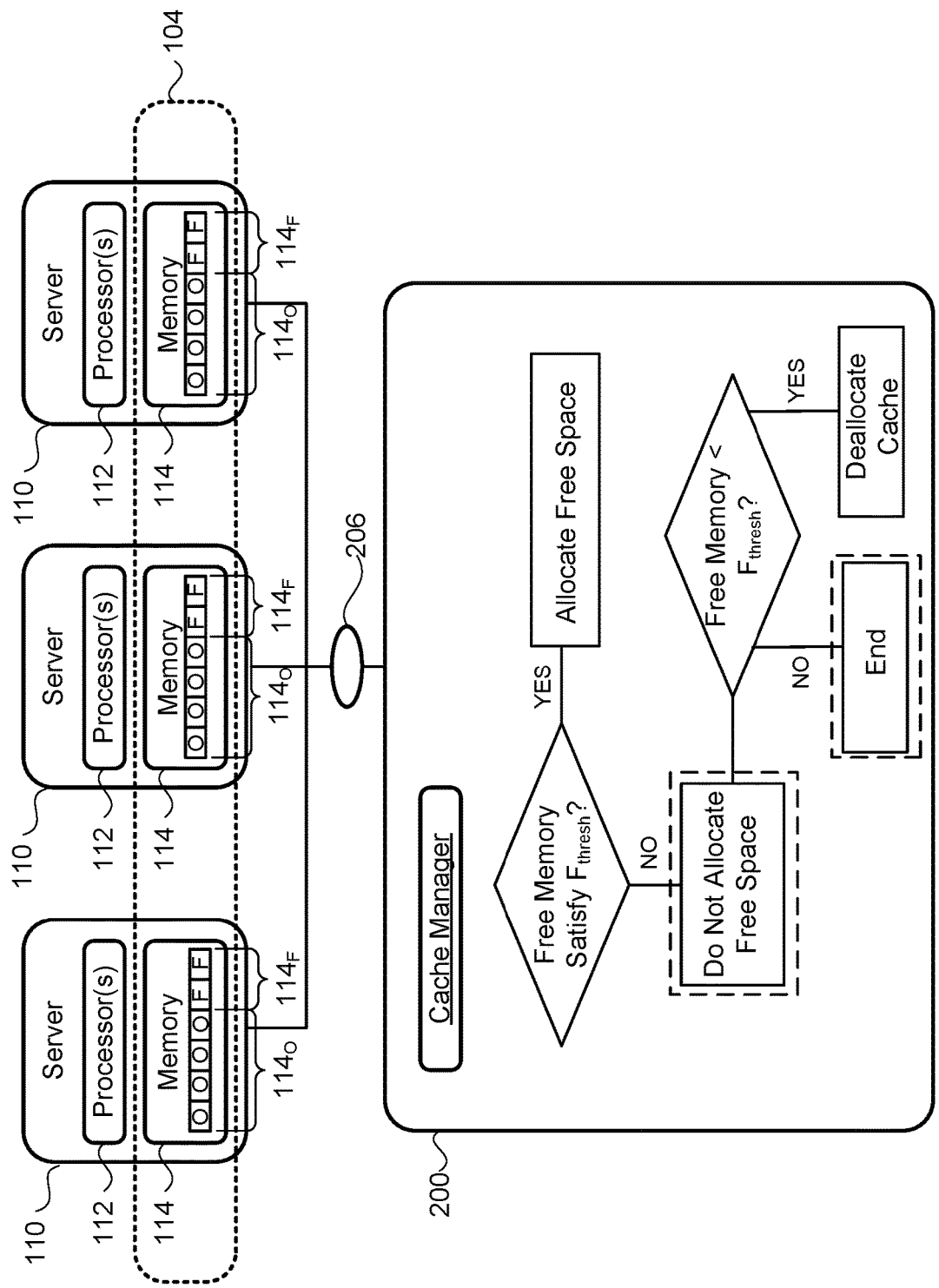
FIGS. 4C-4E are schematic views of an example cache deallocator.
Figure 4D:
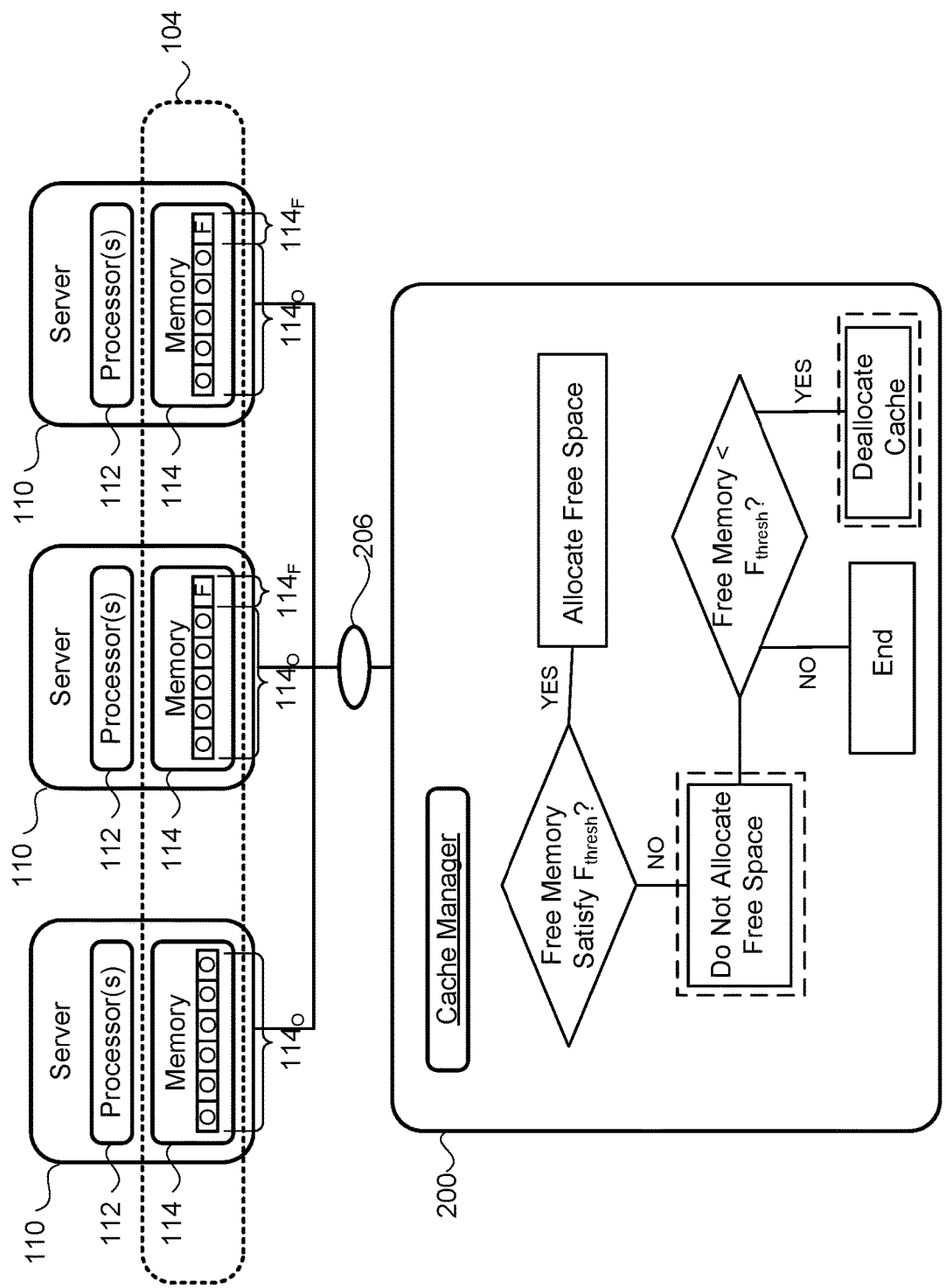

FIGS. 4A, 4C, and 4D are basic examples of the functionality of the cache manager 200. In the examples of FIGS. 4A, 4C, and 4D, the storage abstraction layer 104 includes three memory hosts 110 with memory 114. Each memory 114 includes blocks (e.g., chunks) of RAM that, for simplicity, are either free blocks $114_F$ of RAM contributing to the amount of spare RAM or occupied blocks $114_O$ tied to processes of the distributed storage system 100. With the status request 206, the cache manager 200 determines whether the amount of spare RAM (e.g., free blocks $114_F$ of RAM) satisfies a threshold amount $F_{thresh}$. When the amount of spare RAM $114_F$ satisfies the threshold amount $F_{thresh}$, the cache manager 200 allocates at least one free block $114_F$ of RAM to the cache queue 302 of the cache table 300. Optionally, the cache manager 200 also determines whether at least one free block $114_F$ of RAM has been allocated by the cache allocator 250 to the cache queue 302 of the cache manager 200. In some examples, the threshold amount $F_{thresh}$ corresponds to a predetermined amount of headroom within for the storage resources 114 of distributed storage system 100. The predetermined amount of headroom may correspond to a size of the distributed storage system 100 and/or typical processing requirements (e.g., workload) of the distributed storage system 100. Additionally or alternatively, the threshold amount $F_{thresh}$ accounts for a size of the at least one free block $114_F$. For example, the threshold amount $F_{thresh}$ includes the predetermined amount of headroom along with the size of the at least one free block $114_F$ to be allocated. In this example, accounting for the allocation of the at least one free block $114_F$ by the cache manager 200 ensures that the cache manager 200 does not subsequently deallocate the at least one free block $114_F$.

FIG. 4A is an example of when the cache manager 200 determines the amount of free blocks $114_F$ of RAM satisfies a threshold amount $F_{thresh}$. Here, each of the memory hosts 110 have about a third of their RAM to spare as shown by nine of eighteen total blocks 114 of RAM as free blocks $114_F$ of RAM. A dotted box throughout FIGS. 4A-4E may indicate that a selection within processes of the cache manager 200. As indicated in FIG. 4A, the cache manager 200, based on the determination that the amount of free blocks $114_F$ of RAM satisfies a threshold amount $F_{thresh}$, allocates data to the cache queue 302 of the cache table 300 by the cache allocator process of FIG. 4B.

FIG. 4B is an example of the process of cache allocation by the cache allocator 250 of the cache manager 200. In these examples, the cache allocator 250 preserves physical memory within the storage resources 114 of the distributed storage system 100 as indicated by the free blocks $114_F$ of RAM transforming to cache blocks $114_C$. The cache allocator 250 is also configured to generate a leaf 304 within the cache queue 302 of the cache table 300 based on the at least one free block $114_F$ of RAM. As shown in the example FIG. 4B the cache allocator 250 generates the leaf 304n. In some examples cache allocator 250 uses a mmap operating system call to allocate at least one free block $114_F$ of RAM to the cache table 300.

FIG. 4C is similar to FIG. 4A except that when the cache manager 200 determines whether the amount of free blocks $114_F$ of RAM satisfies the threshold amount $F_{thresh}$, the amount of free blocks $114_F$ of RAM actually equals the threshold amount $F_{thresh}$. In this case, the cache manager 200 does not allocate free space to the cache table 300. Rather, the cache manager 200 here maintains status quo. The cache manager 200 maintains status quo because the cache manager 200, after determining that the amount of free blocks $114_F$ of RAM does not satisfy the threshold amount $F_{thresh}$, inquires whether the amount of free blocks $114_F$ of RAM is less than the threshold amount $F_{thresh}$. When this inquiry is false (e.g., indicated as "NO") the cache manager 200 ends the status request process.

Figure 4E:
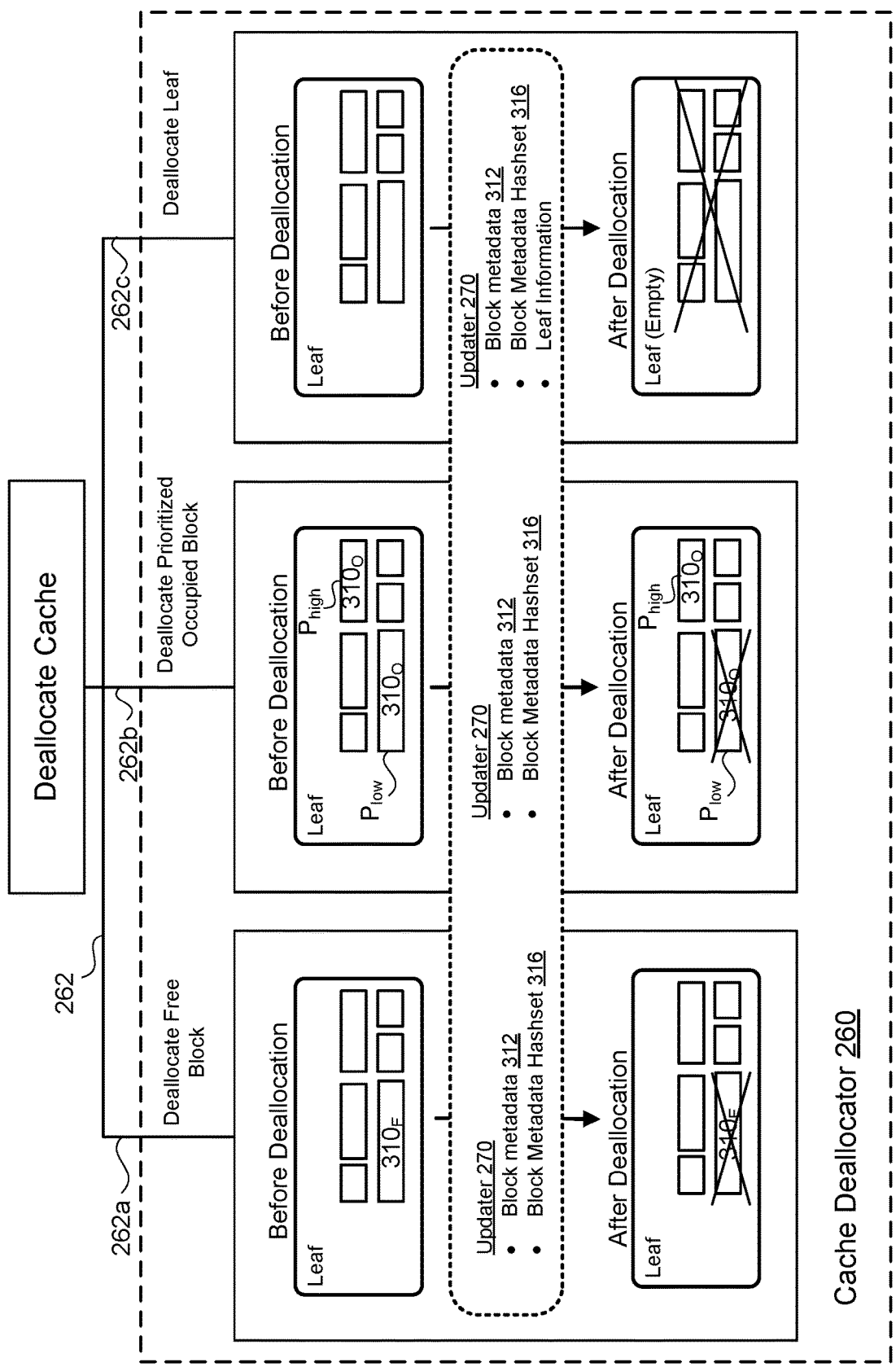

FIG. 4D is similar to FIG. 4C except that when the cache manager 200 determines whether the amount of free blocks $114_F$ of RAM satisfies the threshold amount $F_{thresh}$, the amount of free blocks $114_F$ of RAM fails to satisfy the threshold amount $F_{thresh}$. In this case, the cache manager 200 does not allocate free space to the cache table 300. After determining the amount of free blocks $114_F$ of RAM does not satisfy the threshold amount $F_{thresh}$, the cache manager 200 may additionally inquire whether the amount of free blocks $114_F$ of RAM is less than the threshold amount $F_{thresh}$ When this inquiry is true (e.g., indicated as "YES") the cache manager 200 begins a deallocation process 262 with the cache deallocator 260 as shown in FIG. 4E. As an example, the cache manager 200 may remove, deallocate, or delete a storage resource 114 within the cache table 300 in order for that storage resource 114 to be utilized elsewhere in the distributed storage system 100 (e.g., the host memory 110 requires additional computing and storage resources 112, 114 to operate a process).

As illustrated by FIG. 4E, the deallocation process 262 may include several options as indicated by each branch 262a-c of the deallocation process 262 within the cache deallocator 260. FIG. 4E indicates removal, deallocation, or deletion of a storage resource within the cache table 300 by indication of an "X" through the resource. The deallocation process 262 may also trigger a cache updater 270 of the cache manager 200 to update information related to the cache manager 200 due to removal, deallocation, or deletion of a storage resource within the cache table 300. In other examples, the cache updater 270 is be configured to operate simultaneous to the cache deallocator 260 and/or periodically scan the cache table 300 of the cache manager 200 for changes.

In some examples, when the amount of spare RAM (e.g., free blocks $114_F$) fails to satisfy the threshold amount $F_{thresh}$, the cache deallocator 260 deallocates at least one free block $114_F$ of RAM that has been allocated to the cache table 300. In some implementations, the cache deallocator 260 releases any portion of at least one free block $114_F$ of RAM between an end of the client data 124 and an end of the at least one free block $114_F$ of RAM. This may occur by freeing an allocation on a heap while still retaining it as owner for another process. As shown by branch 262a, the cache deallocator 260 in this circumstance may simply remove a free cache block $310_F$ within a leaf 304. This option 262a may arise, for example, when the difference from failure to satisfy the threshold amount $F_{thresh}$ is marginal and proportional to a free cache block $310_F$ within the cache table 300 rather than an entire leaf 304 or more. In this example, the cache updater 270 updates the block metadata 312 and the block metadata hash set 316 based on the removal of the free cache block $310_F$ within the leaf 304.

Similar to option 262a to deallocate a free cache block $310_F$ of the cache table 300, option 262b deallocates at least one occupied block $310_O$ within the cache table 300 according to priority. The priority P (e.g. the retention priority) is generally stored in block metadata 312. In some examples, the block metadata 312 corresponds to the client metadata $124m$. Although the priority P may be a more complicated indication, for the ease of illustration, FIG. 4E depicts the priority as a basic low priority $P_{low}$ and high priority $P_{high}$. At branch 262b of the deallocation process 262, before deallocation, the leaf 304 includes a first occupied block $310_{O1}$ with low priority $P_{low}$ and a second occupied block $310_{O2}$ with high priority $P_{high}$. When the amount of spare RAM fails to satisfy the threshold amount $F_{thresh}$, the cache deallocator 260 may remove at least one block of client data 124 stored within an occupied block $310_{O1}$ according to priority. Here, the cache deallocator 260 removes the first occupied block $310_{O1}$ of low priority $P_{low}$. In some implementations, the order of priority regarding the deletion of a block 310 is as follows: first, expired low priority client data 124, $P_{low}$; second, expired high priority client data 124, $P_{high}$; third, unexpired low priority client data 124, $P_{low}$; and fourth, unexpired high priority client data 124, $P_{high}$. In some examples, the cache deallocator 260 removes blocks 310 of data from the cache table 300 following this priority process until the amount of spare RAM satisfies the threshold amount $F_{thresh}$. Much like branch 262a, the cache updater 270 updates the block metadata 312 and the block metadata hash set 316 based on the removal of the occupied block $310_O$ within the leaf 304.

In some examples, deletion or removal of client data 124 stored within an occupied block $310_O$ relates to the time to live TTL of the block metadata 312. For example, the cache manager 200 or the client 120 identifies the time to live TTL corresponding to when the client data 124 expires (e.g., temporary client data). The cache deallocator 260 may therefore prioritize the removal or the deletion of expired client data 124. In some examples where the cache deallocator 260 must remove unexpired client data 124, the cache deallocator 260 is configured to prioritize client data 124 by the client metadata $124m$ (e.g., time to live TTL or priority P) such that client data 124 that will expire sooner has a greater likelihood of being deleted or removed than client data 124 identified to expire later. In some examples, the cache manager 200 is configured to determine removal and/deletion based on multiple variables of block metadata 312 and/or client metadata $124m$ (e.g., not solely time to live TTL or priority P). This may be particularly helpful when the client 120 may change the client metadata $124m$ and may therefore biasedly protect its own client data 124 within the distributed storage system 100.

The third branch 262c of the deallocation process 262 entails the cache deallocator 260, in order to satisfy the threshold amount $F_{thresh}$, optionally removing an entire leaf 304. In some implementations, the cache deallocator 260 removes the entire leaf 304 only when the amount of spare RAM indicates such and/or after the cache deallocator 260 determines the removal of a cache block(s) 310 is insufficient. For example, the demands of the computing processing suddenly ramp up and indicate massive data removal at the cache table 300. In examples where the cache deallocator 260 removes an entire leaf 304, the cache updater 270 updates block metadata 312, block metadata hash set 316 and leaf information, such as information related to the status indicator 210, and the cache maps 220, 230.

In some examples for leaf 304 removal, the cache deallocator 260 also determines leaves 304a-n eligible for deallocation. Examples of factors affecting leaf eligibility for deallocation are the age of stored data within a leaf 304, the amount of free cache blocks $310_F$ within a leaf 304, current use of a leaf 304 (e.g., permission key 222 in use), etc. Additionally or alternatively, the deallocation of a leaf 304 may be considered a write request 122 that requires acquisition of a permission key 222 associated with the leaf 304 to be deallocated. Here, when the permission key 222 is acquired, the cache deallocator 260 releases the memory 114 associated with the leaf 304 (e.g., with a munmap operating system call) and also may release the permission key 222 (e.g., for a spinlock).

FIG. 4E illustrates some non-exhaustive updates the cache updater 270 undertakes to maintain the cache manager 200. In some implementations, the cache updater 270 updates and/or maintains the cache manager 200 based on a change to the cache manager 200, but in other implementations, the cache updater 270 periodically maintains the cache manager 200 by scanning each leaf 304 and associated blocks 310 within the cache table 300. This periodic scanning is a type of garbage collection process. The garbage collection process of the cache manager 200 may scan the block metadata hash set 316 and remove expired blocks 310 from the corresponding hash table. In addition to removing expired blocks 310, the garbage process may also remove block metadata 312 associated with leaves 304a-n that no longer exist within the cache table 300 and/or release empty leaf IDs $224_A$ into the free leaf ID pool. For example, the garbage collection process communicates with the status indicator 210 to categorize empty leaf IDs as free leaf IDs.

Figure 5:
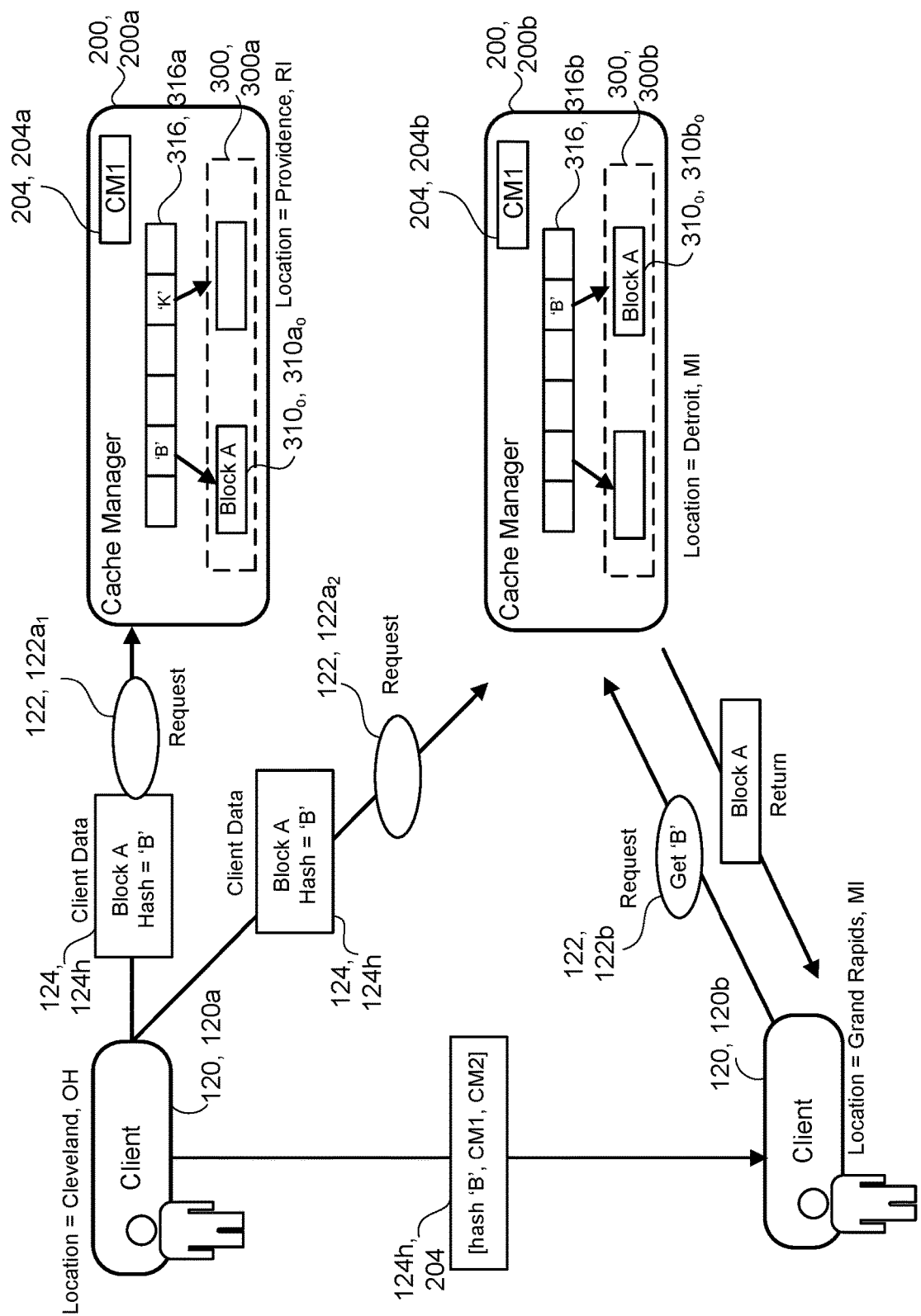
FIG. 5 is a schematic view of an example scaled cache manager.

FIG. 5 is an example of more than one client interacting within the distributed storage system 100. In some examples, a first client 120, 120a sends more than one request 122 to more than one cache manager 200. An advantage of interacting with more than one cache manager 200, such as storing client data 124 in more than one cache manager 200, is that the client 120 may have redundancies for when data gets removed (e.g., deallocated) by the cache manager 200. Clients 120 are generally aware that client data 124 is being stored in a potentially unreliable medium, a cache, and therefore, the client 120 may make trade-offs between replication and ease of access. In some implementations, the cache manager 200 is configured to determine priorities of stored client data 124 because the priority may indicate a likelihood of data replication. For example, high priority $P_{high}$ client data 124 results in more replications of the client data 124 across multiple memory hosts 110 as compared to low priority $P_{low}$ client data 124. Additionally or alternatively, the first client 120, 120a may send requests 122 to several cache managers 200 to determine which cache manager 200 is least utilized. In this example, a less utilized cache manager 200 is unlikely, in several circumstances, to deallocate the client data 124 related to the request 122.

Referring further to FIG. 5, the first client 120, 120a sends two requests 122, $122a_{1-2}$ to a first cache manager 200, 200a and a second cache manager 200, 200b. In this example, the first client 120, 120a sends two write requests 122, $122a_{1-2}$. The first client 120, 120a also sends client data 124 (i.e. "block A") along with a corresponding client data hash 124h (shown as hash 'B'). Here, each cache manager 200, 200a-b has allowed the first client 120, 120a to write to corresponding caches 300, 300a-b of each cache manager 200, 200a-b. Each cache manager 200, 200a-b updates the hash map (e.g., the block metadata hash set 316) for the client data hash 124h associated with the client data 124. As an out-of-process system, the first client 120, 120a stores information regarding the data transaction, such as the respective client data hash 124h along with the cache manager address 204 and may propagate this transaction information as the client 120 sees fit. Here, the first client 120, 120a shares the client data hash 124h (i.e. "hash B") and the cache manager addresses 204, 204a-b with a second client 120, 120b. In this example, the second client 120, 120b communicates a request 122, 122b to read the client data hash 124h (e.g., get 13') from the second cache manager 200, 200b. FIG. 5 depicts that as a result of that read request 122, 122b, the second client 120, 120b receives as a return, "block A." In other words, the second manager 200, 200b maps the communicated client data hash 124h (e.g., 13') with the block metadata hash set 316 to identify a storage location or address associated with the client data hash 124h (e.g., occupied block $310_O$, $310b_O$. Furthermore, although FIG. 5 depicts two clients 120, 120a-b and two cache managers 200, 200a-b, this cache manager 200 is scalable such that the distributed storage system 100 includes multiple clients 120, cache managers 200, and potential cache resources.

In some implementations, the client 120 decides which cache manager 200 to request (e.g., read/write request) based on a location and/or proximity of the cache manager 200. For example, the second client 120, 120b chose to send a read request 122, 122b for the client data 124 because the second cache manager 200, 200b has a location of Detroit, Mich., which is relatively close to a location of the second client 120, 120b, Grand Rapids, Mich. Similarly, the first client 120, 120a may have chosen to write the client data 124 to the first cache manager 200, 200a and the second cache manager 200, 200b because of proximity to the cache managers 200, 200a-b. An advantage of proximity to cache managers 200 and/or memory hosts 110 is that the proximity may reduce data access latency and computational resources associated with access latency.

Figure 6A:
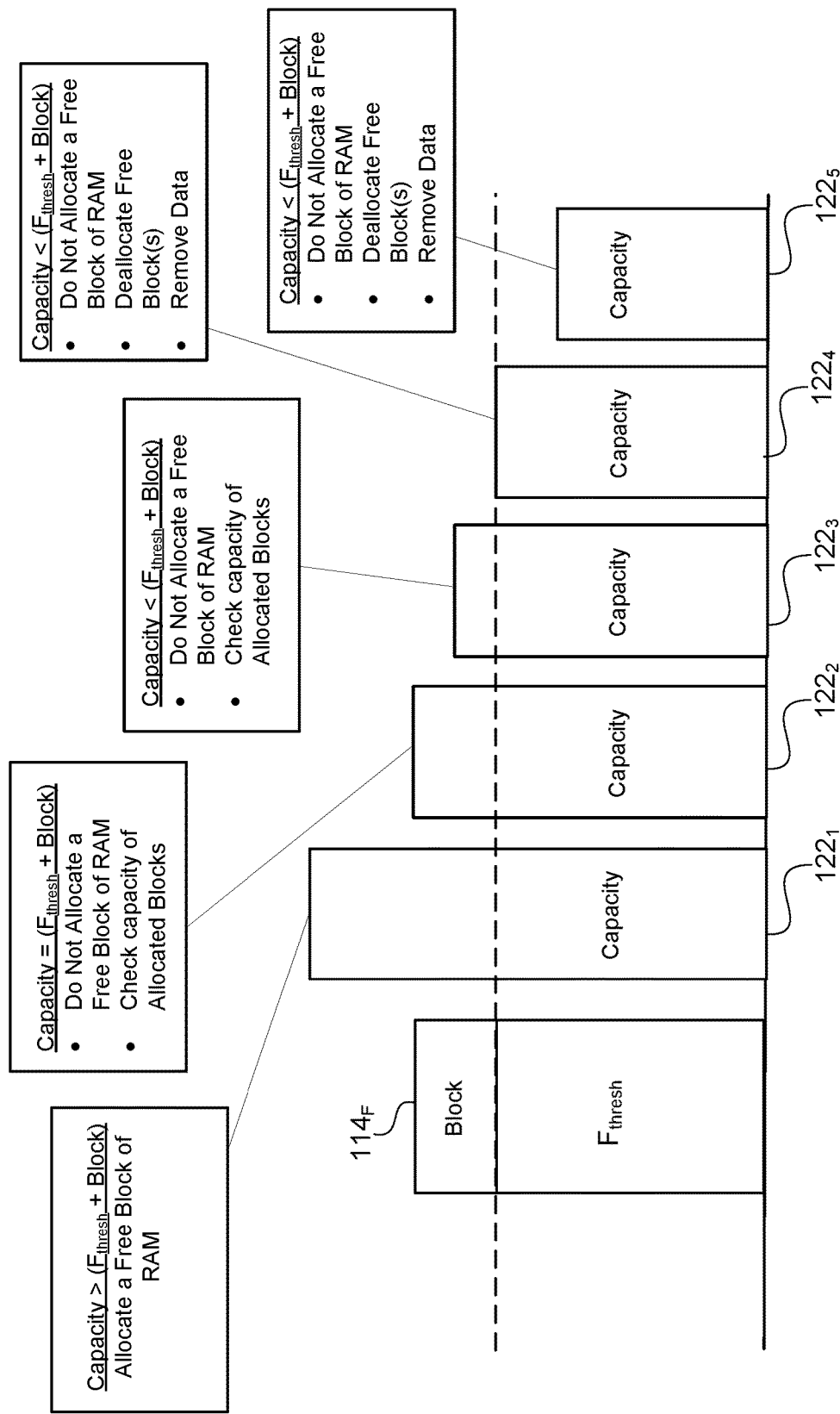
FIGS. 6A and 6B are schematic views of functions performed by a cache manager.
Figure 6B:
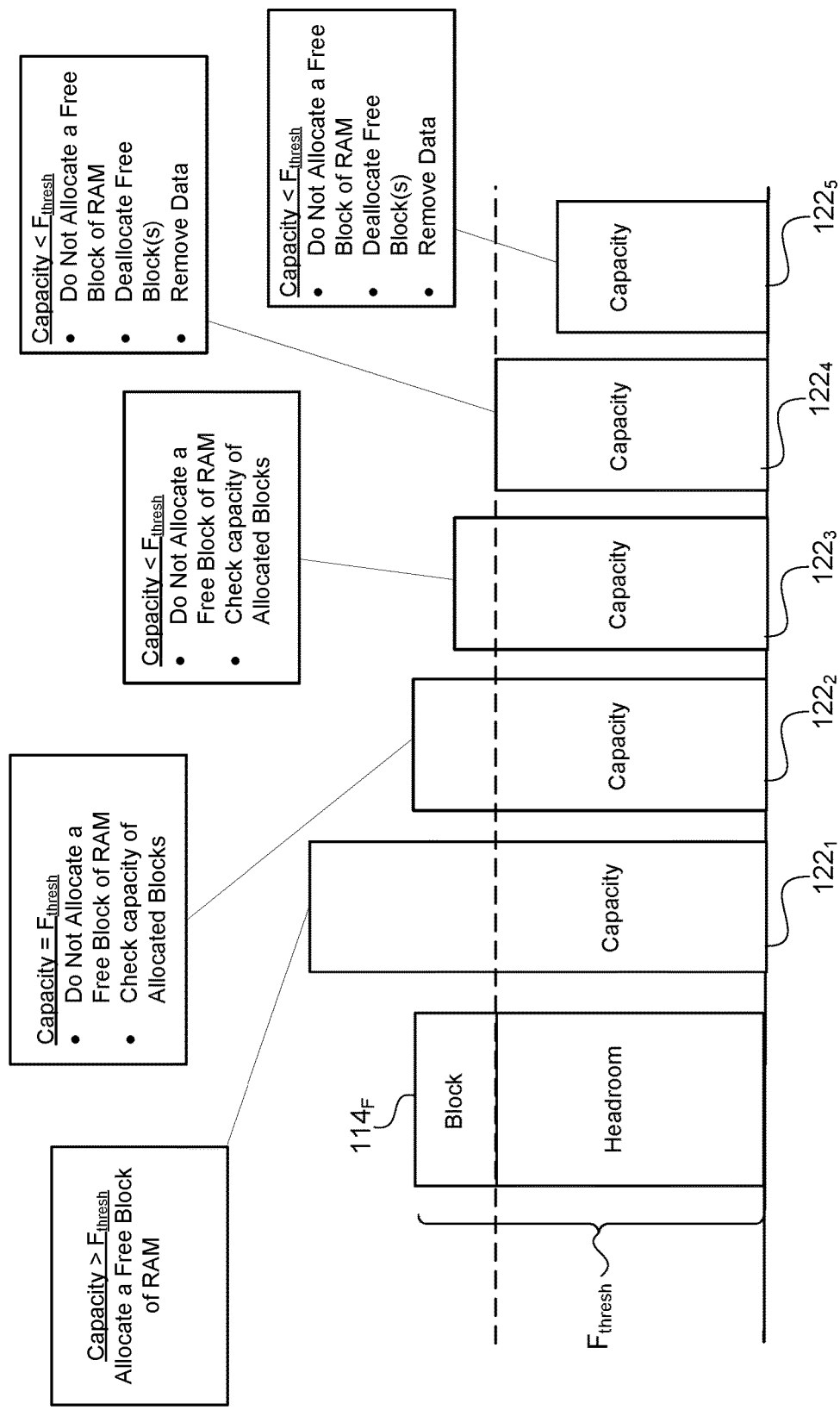

FIGS. 6A and 6B illustrate more detailed examples of when the cache manager 200 determines the amount of spare RAM (designated as "capacity"). FIG. 6A is an example where the cache manager 200 determines the amount of space RAM with respect to at least one free block $114_F$ in addition to the threshold amount $F_{thresh}$; whereas FIG. 6B is an example where the threshold amount $F_{thresh}$ includes the at least one free block $114_F$. There are different advantages to each of these configurations. Referring to the examples of FIGS. 6A and 6B, the cache manager 200 determines the capacity for five different requests $122_{(1-5)}$. Each request 122 corresponds to a capacity that may trigger the cache manager 200 to perform different functions based on the determination of spare RAM (i.e. capacity).

Referring further to FIG. 6A, at the first request $122_1$, the cache manager 200 determines that the capacity exceeds the threshold amount $F_{thresh}$ in addition to the at least one free block $114_F$. In this circumstance, the cache manager 200 may allocate at least one free block $114_F$ of RAM. At the second request $122_2$, the cache manager 200 determines that the capacity exceeds the threshold amount $F_{thresh}$, but, in excess of the threshold amount $F_{thresh}$, equals the at least one free block $114_F$. Here the cache manager 200 may not allocate at least one free block $114_F$ of RAM and/or may monitor the capacity of allocated blocks 310 (or leaves 304) in the queue 302. At the third request $122_3$, the cache manager 200 determines that the capacity exceeds the threshold amount $F_{thresh}$, but is less than the at least one free block $114_F$. In this instance, similar to the second request $122_2$, the cache manager 200 may not allocate a free block $114_F$ of RAM and/or may monitor the capacity of allocated blocks 310 (or leaves 304) in the queue 302 to determine if the capacity later also exceeds the at least one block $114_F$ or later falls below the threshold amount $F_{thresh}$. In some examples where the capacity exceeds the threshold amount $F_{thresh}$, but is less than the at least one free block $114_F$, the cache manager 200 is configured to perform alternative functions such as reducing a size of the at least one block $114_F$ for allocation based on the amount exceeding the threshold amount $F_{thresh}$. At a fourth and a fifth request $122_4$, $122_5$, the cache manager 200 determines that the capacity is less than the threshold amount $F_{thresh}$ and, compared to the third request $122_3$, may additionally deallocate free block(s) $114_F$ and remove client data 124. The fourth request $124_4$, more specifically represents that when the cache manager 200 determines a capacity equal to the threshold amount $F_{thresh}$ the cache manager 200 may only deallocate free block(s) $114_F$ but not remove client data 124 at this time.

FIG. 6B is similar to FIG. 6A except that the cache manager 200 has less granularity to distinguish between both the free block $114_F$ and the threshold amount $F_{thresh}$. For example, in the third, fourth and fifth requests $122_{3-5}$, the cache manager 200 of FIG. 6B can only distinguish that the capacity is less than the threshold amount $F_{thresh}$ rather than also determine if there is capacity in excess of the headroom, but less than and/or equal to the at least one block $114_F$. Depending on a desired design or a desired computational complexity of the cache manager 200, the cache manager 200 may have some functional advantages with increased granularity (e.g., FIG. 6A) or with less granularity (FIG. 6B). For example, less granularity increases the potential computing speed of the cache manager 200.

Figure 7:
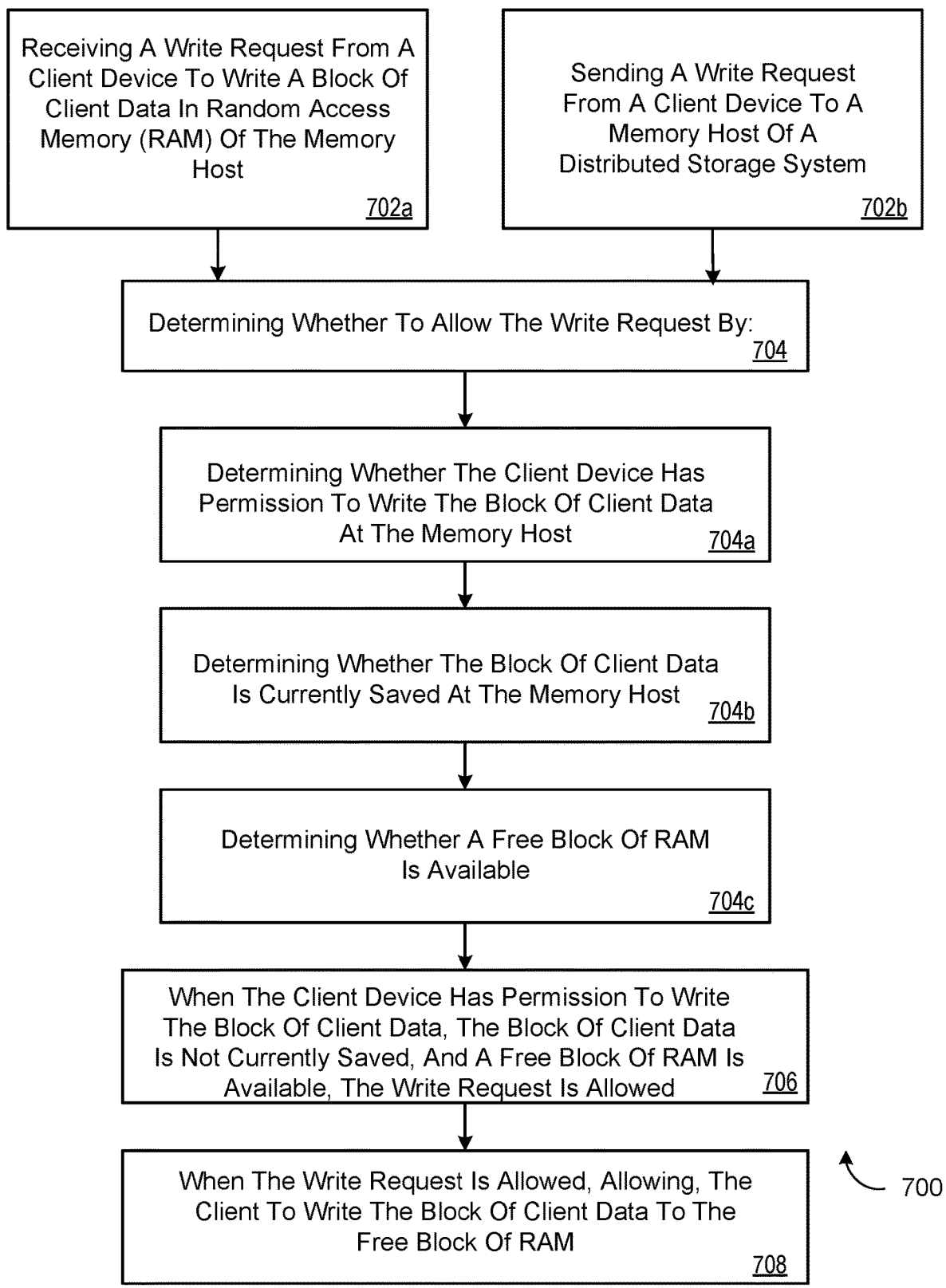
FIG. 7 is a flowchart of an example arrangement of operations for an in-memory distributed cache.

FIG. 7 is an example method 700 of operating an in-memory distributed cache. At 702a, the method 700 includes receiving a write request 122 from a client device 120 to write a block of client data 124 in RAM of the memory host 110. At 702b, the method 700 includes sending a write request 122 from a client device 120 to a memory host 110 of a distributed storage system 100. At 704, the method 700 further includes determining whether to allow the write request 122. At 704a-d, the method also includes determining whether the client device 120 has permission to write the block f client data 124 at the memory host 110; whether the block of client data 124 is currently saved at the memory host 110; and whether a free block $114_F$ block of RAM is available. At 706, the method 700 allows the write request 122 when the client device 120 has permission to write the block of client data 124, the block of client data 124 is not currently saved, and a free block $114_F$ of RAM is available. At 708, when the write request is allowed, the method 700 includes allowing the client 120 to write the block of client data 124 to the free block $114_F$ of RAM.

Figure 8:
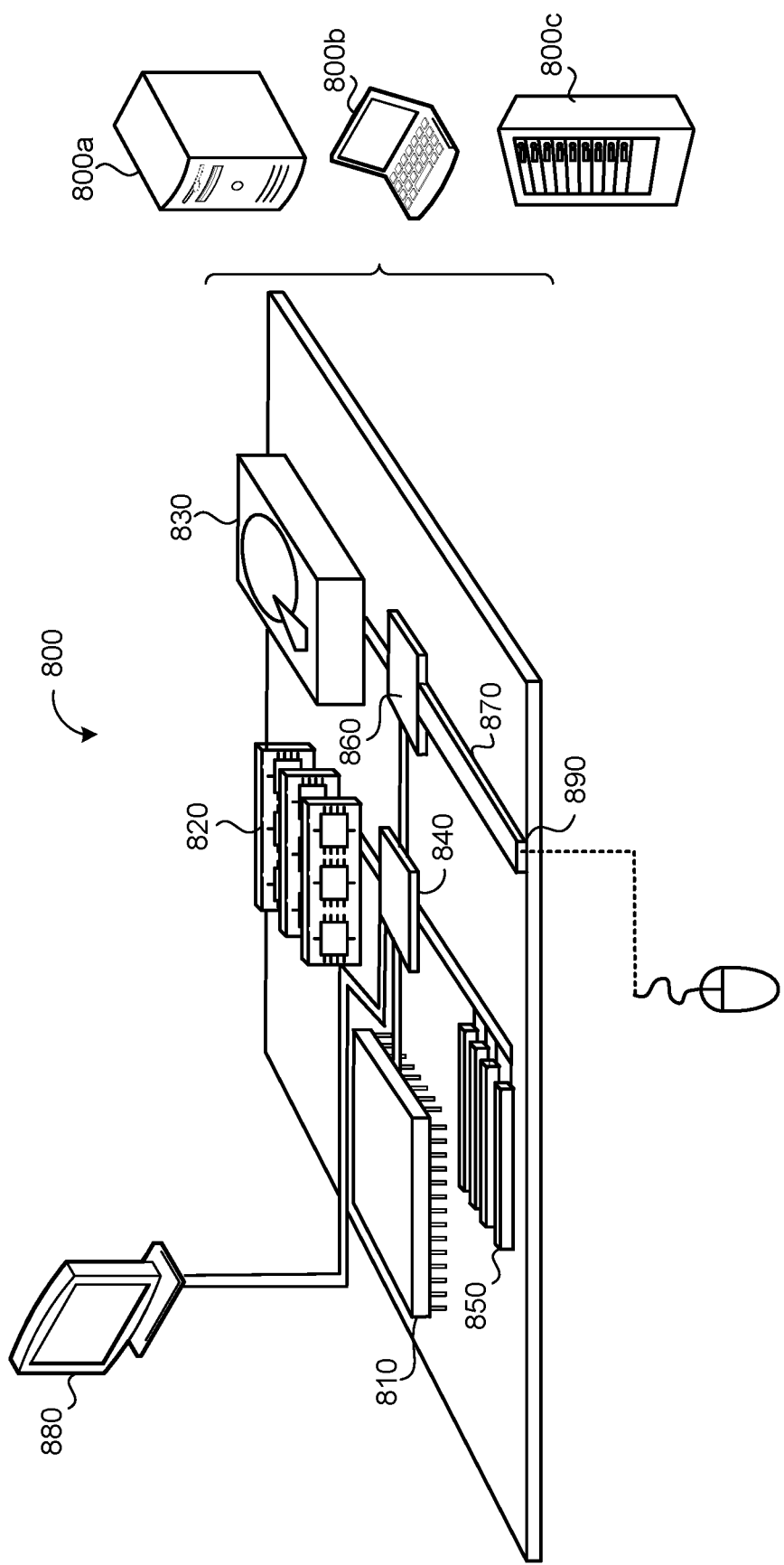
FIG. 8 is a schematic view of an example computing device that may be used to implement the systems and methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   determining an amount of spare dynamic random access memory (DRAM) available on a memory host of a distributed storage system storing a plurality of client data blocks, each client data block of the plurality of client data blocks comprising a respective time to live indicating when the client data block expires;
   determining that the amount of spare DRAM fails to satisfy a threshold amount corresponding to a predetermined amount of headroom within the memory host of the distributed storage system; and
   based on determining that the amount of spare DRAM fails to satisfy the threshold amount:
      deleting one or more client data blocks of the plurality of client data blocks from the memory host based on the respective time to live of each client data block of the plurality of client data blocks; and
      deallocating at least one free block of DRAM from a free block queue.

2. The computer-implemented method of claim 1, wherein the operations further comprise:
   after determining the amount of spare DRAM available on the memory host of the distributed storage system, determining an updated amount of spare DRAM available on the memory host of the distributed storage system;
   determining that the updated amount of spare DRAM satisfies the threshold amount; and
   based on determining that the updated amount of spare DRAM satisfies the threshold amount, allocating at least one free block of DRAM to a free block queue.

3. The computer-implemented method of claim 1, wherein each respective client data block of the plurality of client data blocks further comprises a priority indicating a replication level of the respective client data block throughout the distributed storage system.

4. The computer-implemented method of claim 3, wherein the operations further comprise selecting the one or more client data blocks for deletion by:
   selecting expired low priority client data first;
   selecting expired high priority client data second;
   selecting low priority client data third; and
   selecting high priority client data fourth, until the amount of spare DRAM satisfies the threshold amount.

5. The computer-implemented method of claim 1, wherein the operations further comprise:
   receiving a write request from a client device to write a new client data block in DRAM of the memory host;
   determining that the received write request is allowed; and
   writing the new client data block to a free block of DRAM from a free block queue.

6. The computer-implemented method of claim 5, wherein:

the write request comprises a respective client data hash of the new client data block; and determining that the received write request is allowed is based on whether the new client data block is currently saved at the memory host by determining whether a hash map comprises a mapping for the respective client data hash.

7. The computer-implemented method of claim 5, wherein the operations further comprise, after writing the new client data block, updating a block metadata table comprising a hash map mapping a client data hash to the new client data block and metadata for the new client data block, the metadata comprising at least one of a client identifier, a retention priority, a time to live, or a length of the new client data block.

8. The computer-implemented method of claim 5, wherein the operations further comprise, after writing the new client data block, validating the new client data block based on a length of the new client data block or a respective client data hash to the new client data block.

9. The computer-implemented method of claim 1, wherein the operations further comprise:

receiving a read request comprising a client data hash of a stored client data block; and allowing remote direct memory access (RDMA) of the stored client data block.

10. A system comprising:

data processing hardware; and memory hardware in communication with the data processing hardware, the memory hardware storing instructions that when executed by the data processing hardware cause the data processing hardware to perform operations comprising:

determining an amount of spare dynamic random access memory (DRAM) available on a memory host of a distributed storage system storing a plurality of client data blocks, each client data block of the plurality of client data blocks comprising a respective time to live indicating when the client data block expires;

determining that the amount of spare DRAM fails to satisfy a threshold amount corresponding to a predetermined amount of headroom within the memory host of the distributed storage system; and based on determining that the amount of spare DRAM fails to satisfy the threshold amount:

deleting one or more client data blocks of the plurality of client data blocks from the memory host based on the respective time to live of each client data block of the plurality of client data blocks; and deallocating at least one free block of DRAM from a free block queue.

11. The system of claim 10, wherein the operations further comprise:

after determining the amount of spare DRAM available on the memory host of the distributed storage system, determining an updated amount of spare DRAM available on the memory host of the distributed storage system;

determining that the updated amount of spare DRAM satisfies the threshold amount; and based on determining that the updated amount of spare DRAM satisfies the threshold amount, allocating at least one free block of DRAM to a free block queue.

12. The system of claim 10, wherein each respective client data block of the plurality of client data blocks further comprises a priority indicating a replication level of the respective client data block throughout the distributed storage system.

13. The system of claim 12, wherein the operations further comprise selecting the one or more client data blocks for deletion by:

selecting expired low priority client data first;

selecting expired high priority client data second;

selecting low priority client data third; and selecting high priority client data fourth, until the amount of spare DRAM satisfies the threshold amount.

14. The system of claim 10, wherein the operations further comprise:

receiving a write request from a client device to write a new client data block in DRAM of the memory host;

determining that the received write request is allowed; and writing the new client data block to a free block of DRAM from a free block queue.

15. The system of claim 14, wherein:

the write request comprises a respective client data hash of the new client data block; and determining that the received write request is allowed is based on whether the new client data block is currently saved at the memory host by determining whether a hash map comprises a mapping for the respective client data hash.

16. The system of claim 14, wherein the operations further comprise, after writing the new client data block, updating a block metadata table comprising a hash map mapping a client data hash to the new client data block and metadata for the new client data block, the metadata comprising at least one of a client identifier; a retention priority; a time to live, or a length of the new client data block.

17. The system of claim 14, wherein the operations further comprise, after wilting the new client data block, validating the new client data block based on a length of the new client data block or a respective client data hash to the new client data block.

18. The system of claim 10, wherein the operations further comprise:

receiving a read request comprising a client data hash of a stored client data block; and allowing remote direct memory access (RDMA) of the stored client data block.

* * * * *